US012706459B2

(12) United States Patent
Shahriar et al.

(10) Patent No.: US 12,706,459 B2
(45) Date of Patent: Aug. 11, 2026

(54) GRID ADAPTER SYSTEMS AND METHODS

(71) Applicant: Adaptr, Inc., Toronto (CA)

(72) Inventors: Hassan Shahriar, Toronto (CA); Amgad El-Deib, Toronto (CA)

(73) Assignee: Adaptr, Inc., Toronto (CA)

( * ) Notice: Subject to any disclaimer, the term of this patent is extended or adjusted under 35 U.S.C. 154(b) by 123 days.

(21) Appl. No.: 18/532,955

(22) Filed: Dec. 7, 2023

(65) Prior Publication Data

US 2024/0195175 A1 Jun. 13, 2024

Related U.S. Application Data

(60) Provisional application No. 63/431,472, filed on Dec. 9, 2022.

(51) Int. Cl.
*H02J 3/32* (2026.01)
*B60L 53/54* (2019.01)
(Continued)

(52) U.S. Cl.
CPC ................ *H02J 3/32* (2013.01); *B60L 53/54* (2019.02); *H02J 3/322* (2020.01); *H02J 3/38* (2013.01);
(Continued)

(58) Field of Classification Search
CPC ................ H02J 3/28–322; H02J 3/381; B60L 53/50–56
See application file for complete search history.

(56) References Cited

U.S. PATENT DOCUMENTS 10,931,190 B2 * 2/2021 Mondal ..................... H02J 3/32
11,183,848 B2 11/2021 Peng et al.
(Continued)

FOREIGN PATENT DOCUMENTS

WO WO-2015029941 A1 * 3/2015 ............ H01M 8/188
WO WO-2021/146806 A1 7/2021

OTHER PUBLICATIONS

English machine translation of WO2015029941A1 published Mar. 5, 2015 (Year: 2015).*
(Continued)

*Primary Examiner* — Rexford N Barnie
*Assistant Examiner* — David A Shiao
(74) *Attorney, Agent, or Firm* — Foley & Lardner LLP

(57) ABSTRACT

Embodiments described herein include systems and methods for managing electrical power among various energy generation, storage, and consumption systems, including micro-grids or nano-grids. Computing systems and electrical hardware send and receive electrical power, to or from various energy storage, transfer, and consumption sites, particularly where certain nano-grids are not electrically wired to the energy generation and storage subsystems. A grid adapter receives energy from various sources, reduces noise in the electrical waveform (e.g., harmonics), and determines an amount of power to deliver to nano-grids via electrical connections or delivery vehicles to achieve acceptable operation according to grid codes or other operational configurations. A storage system may include a flow battery that exchanges electricity, based on required power or surplus power, with delivery vehicles according to an electrolyte swap for the flow battery.

20 Claims, 21 Drawing Sheets

(51) Int. Cl.

| | |
|---|---|
| ***H02J 3/38*** | (2006.01) |
| *H01M 8/0289* | (2016.01) |
| *H01M 8/18* | (2006.01) |
| *H02J 3/01* | (2006.01) |
| *H02J 101/30* | (2026.01) |

(52) U.S. Cl.

CPC ........... *H02J 3/381* (2013.01); *H01M 8/0289* (2013.01); *H01M 8/188* (2013.01); *H01M 2250/20* (2013.01); *H02J 3/01* (2013.01); *H02J 2101/30* (2026.01)

(56) References Cited

U.S. PATENT DOCUMENTS

| | | | | |
|---|---|---|---|---|
| 11,498,445 | B1 * | 11/2022 | Gurin | B60L 53/54 |
| 2008/0067869 | A1 * | 3/2008 | Evans | H02J 4/25 307/11 |
| 2011/0095606 | A1 * | 4/2011 | Ou | H02J 7/35 307/26 |
| 2011/0282807 | A1 * | 11/2011 | Colello | H02J 3/008 320/128 |
| 2012/0166013 | A1 * | 6/2012 | Park | H02J 3/32 700/297 |
| 2013/0182474 | A1 * | 7/2013 | Luo | H02J 3/381 363/95 |
| 2016/0006253 | A1 * | 1/2016 | Saussele | H02J 3/38 307/24 |
| 2017/0250550 | A1 | 8/2017 | Miftakhov et al. | |
| 2019/0168630 | A1 * | 6/2019 | Mrlik | B60L 53/60 |
| 2019/0322189 | A1 * | 10/2019 | Allison | B60L 55/00 |
| 2021/0098990 | A1 | 4/2021 | Peng et al. | |
| 2022/0121260 | A1 * | 4/2022 | King | H02J 3/381 |
| 2023/0012882 | A1 * | 1/2023 | Katcha | H02M 7/4833 |
| 2023/0291222 | A1 * | 9/2023 | Mitsunaga | H02J 1/00 |
| 2023/0333525 | A1 * | 10/2023 | Ichi | G05B 15/02 |
| 2023/0333529 | A1 * | 10/2023 | Ichi | G05B 19/042 |
| 2024/0305128 | A1 * | 9/2024 | Schumann | B60L 53/51 |

OTHER PUBLICATIONS

Alatai, S., Salem, M., Ishak, D., Das, H. S., Alhuyi Nazari, M., Bughneda, A., & Kamarol, M. (2021). A Review on State-of-the-Art Power Converters: Bidirectional, Resonant, Multilevel Converters and Their Derivatives. Oct. 29, 2021. Applied Sciences, 11(21) 10172. (Year: 2021).*

International Search Report and Written Opinion dated Mar. 18, 2024 on PCT Matter PCT/CA2023/051625 (9 pages).

* cited by examiner

MGCC – Mobile Grid Control Centre

CES – Central Energy Storage; a = 1..m

LES – Local Energy Storage; x = 1...n

SEV – Stored Energy Vehicles

NGC – Nano-Grid Controller; x = 1...n

LDC – Local Demand Controller; y = 1...o

DG – Distributed Generation; z = 1...p

LVNE – Low Voltage Network Elements

Met – Local Meteorological Data

CI – Consumer Inputs

UI – Utility Inputs

↔ Communications Network

Distribution Network 515

MV

LV

516

GA 517

Grid Adapter Controller 519

Multi-level Converter 540

Internal Hybrid ESS 542

Multi-level Converter 540

Bidirectional DC/DC Converters 544

Bidirectional DC/DC Converters 544

EV Station (V2G) 522

External ESS 1 524

External ESS 2 524

EV Station (V2G) 522

506

Internal DC links

AC Micro / Nano-grid 508

500

Distribution Network 515

MV

LV

516

GA 517

Grid Adapter Controller 519

Multi-level Converter 540

Internal Hybrid ESS 542

DC/DC Converter 545

DC/DC Converter 545

Multi-level Converter 540

DC Generation 503

DC Load 502

AC Load & Generation 504

Internal DC links

500

GAC – Grid Adapter Controller;

BMS – Battery Management System;

ESS – Internal Energy Storage; x = 1…a

Local controller – for each converter; y = 1…b

Converter – Various AC/DC converters; y = 1…b

Data flows

Control Commands

GRID ADAPTER SYSTEMS AND METHODS

CROSS-REFERENCE TO RELATED APPLICATION

This application claims priority U.S. Provisional Patent Application No. 63/431,472, filed Dec. 9, 2022, which is incorporated by reference in its entirety.

TECHNICAL FIELD

This application generally relates to managing delivery of electrical energy from generation sources to various types of grid systems, including nano-grid systems.

BACKGROUND

Electricity generation has evolved significantly, especially with the rise of renewable energy generators such as wind turbines and solar photovoltaic (PV) systems. Additionally, electricity consumption is also changing with electrification of transportation modalities, such as electric vehicles (EVs), and heating homes (e.g., heat pumps). These generation and consumption trends are also being accelerated by policies aimed at reducing emissions and combatting climate change. Governments at all levels in various countries are formulating policies around net-zero targets in order to accelerate energy transition to clean renewable energy sources. This goal for net-zero transition is obligating distribution system operators to accommodate behind-the-meter solar PV generation as well as integration of EV charging/discharging systems.

However, adding large quantities of EV charging stations (EV-stations) can introduce harmonic pollution to the distribution power system. Similarly, increasing the number of intermittent inverter-based generators reduces distribution grid inertia, exposing the power system to low frequency oscillations. Harmonics and oscillations add wear and tear to existing distribution assets thus requiring substantial upgrade to the distribution system hardware and management to address the power quality issues.

SUMMARY

This disclosure details a power system device (sometimes referred to herein as a "grid adapter") that allows greater protection and flexibility in the adoption of distributed energy resources (DERs) and EV-stations while limiting the amount of network upgrades needed to achieve stable operation of the power system. Moreover, high frequency harmonics distort the sinusoidal AC power of a distribution grid. This negatively impacts the operation of the power system materializing as faults in the protection relay operation, as an example. The grid adapter blocks unwanted noise (e.g., harmonics) through a series of power conversion and control of the sinusoidal AC power.

Embodiments described herein include systems and methods for managing electrical power within various energy generation, storage, and consumption systems, including micro-grids or nano-grids. Computing systems and electrical hardware send and receive electrical power, to or from various energy storage, transfer, and consumption sites, particularly where certain nano-grids are not electrically wired to the energy generation and storage subsystems. A grid adapter receives energy from various sources, reduces noise in the electrical waveform (e.g., harmonics), and determines an amount of energy to deliver to nano-grids via electrical connections or delivery vehicles. A storage system may include a flow battery that exchanges required energy or surplus energy with delivery vehicles according to an electrolyte swap for the flow battery.

In an embodiment, a system comprises a grid adapter. The grid adapter comprises an internal storage system configured for storing an amount of internal-stored energy. The first power processing unit configured for converting an amount of power associated with a nano-grid. The first power processing unit includes a bidirectional converter for converting input electricity or output electricity according to according to an operational instruction indicating a power flow direction. The grid adapter comprises a grid adapter controller configured for executing software programming. The grid adapter controller configured to receive, from one or more data sources, power data indicating a power requirement for a nano-grid; and transmit an instruction to the internal storage system to exchange the amount of power with the nano-grid, via the first power processing unit, according to the power requirement.

The operational instruction may be based upon one or more configurations, including an objective configurations. The objective configuration for the operational instruction may indicate the energy direction for the objective of the converting operation, including at least one of export the output electricity from a grid or import the input electricity to the grid. The operational instruction may indicate the amount of energy or power associated with the nano-grid.

The system may further comprise an external storage system for storing energy according to the grid adapter controller, including the amount of power indicated by the power requirement for the nano-grid.

The external storage system may include a first flow battery for exchanging the amount power via an electrolyte swap with at least one of a second flow battery of a storage vehicle or a vehicle electrolyte tank of the storage vehicle configured to contain an electrolyte fluid.

The external storage system may include a reactor stack of the first flow battery and a storage system electrolyte tank configured to contain the electrolyte fluid.

The system may further comprise one or more power processing units, including the first power processing unit. Each power processing unit includes one or more power converters configured to reduce an amount of noise on an electricity waveform.

The system may further comprise a second processing unit configured to convert a second amount of power associated with a distributed energy resource. The second processing unit includes a direct current-to-direct current converter for converting input electricity or output electricity according to the second amount of power.

The system may further comprise a second processing unit configured to convert a second amount of power associated with a distributed energy resource. The second processing unit includes an alternating current-to-direct current converter for converting input electricity or output electricity according to the second amount of power.

The system may further comprise a second processing unit including a multi-level converter configured to convert input electricity received from a distribution network grid coupled to the grid adapter.

The grid adapter may be disconnected from a distribution network grid.

In another embodiment, a system comprises a grid adapter and an external storage system. The grid adapter comprises an internal storage system configured to store internal-stored energy; and a first power processing unit configured for converting an amount of power for exchange with a nano-grid. The first power processing unit includes a bidirectional converter configured to convert the amount of power for exchange between the internal storage system and the nano-grid according to an operational instruction indicating a power flow direction. The external storage system comprises a first flow battery configured to exchange the amount power via an electrolyte swap with at least one of a second flow battery of a storage vehicle or an electrolyte tank of the storage vehicle.

The operational instruction may be based upon one or more configurations, including an objective configurations. The objective configuration for the operational instruction may indicate the energy direction for the objective of the converting operation, including at least one of export the output electricity from a grid or import the input electricity to the grid. The operational instruction may indicate the amount of energy or power associated with the nano-grid.

The system may further comprise a grid adapter controller for executing software programming, configured to: receive, from one or more data sources, power data indicating a power requirement for a nano-grid; and transmit an instruction to the internal storage system to exchange the amount of power with the nano-grid, via the first power processing unit, according to the power requirement.

The external storage system may include a reactor stack of the first flow battery and a storage system electrolyte tanks configured to contain an electrolyte fluid.

The system may further comprise one or more power processing units, including the first power processing unit. Each power processing unit includes one or more power conversions configured to reduce an amount of noise on an electricity waveform.

The system may further comprise a second processing unit configured to convert a second amount of power associated with a distributed energy resource. The second processing unit includes a direct current-to-direct current converter for converting input electricity or output electricity according to the second amount of power.

The system may further comprise a second processing unit including a multi-level converter configured to convert input electricity received from a distribution network grid coupled to the grid adapter.

The grid adapter may be disconnected from a distribution network grid.

In yet another embodiment, a system comprises a grid adapter. The grid adapter comprises an internal storage system, a first power processing unit, and a second processing unit. The internal storage system configured for storing an amount of internal-stored energy. The first power processing unit configured for converting an amount of power associated with a nano-grid. The first power processing unit includes a bidirectional converter configured to reduce noise on a first electrical waveform from an external storage system. The second processing unit configured for converting distributed energy from a distributed network grid. The second processing unit includes a multi-level converter configured to reduce the noise on a second electrical waveform of the distributed energy from the distribution network grid coupled to the grid adapter.

The operational instruction may be based upon one or more configurations, including an objective configurations. The objective configuration for the operational instruction may indicate the energy direction for the objective of the converting operation, including at least one of export the output electricity from a grid or import the input electricity to the grid. The operational instruction may indicate the amount of energy or power associated with the nano-grid.

The external storage system may comprise a first flow battery configured to exchange the amount of power via an electrolyte swap with at least one of a second flow battery of a storage vehicle or an electrolyte tank of the storage vehicle.

The system may further comprise a grid adapter controller for executing software programming. The grid adapter controller may be configured to receive, from one or more data sources, power data indicating a power requirement for the nano-grid; and transmit an operational instruction to the internal storage system to exchange the amount of power with the nano-grid, via the first power processing unit, according to the power requirement.

The system may further comprise a third processing unit for converting a second amount of power associated with a distributed energy resource. The third processing unit includes at least one of a direct current-to-direct current converter or an alternating current-to-direct current converter configured to reduce the noise on a third electrical waveform of the second amount of power from the distributed energy resource.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
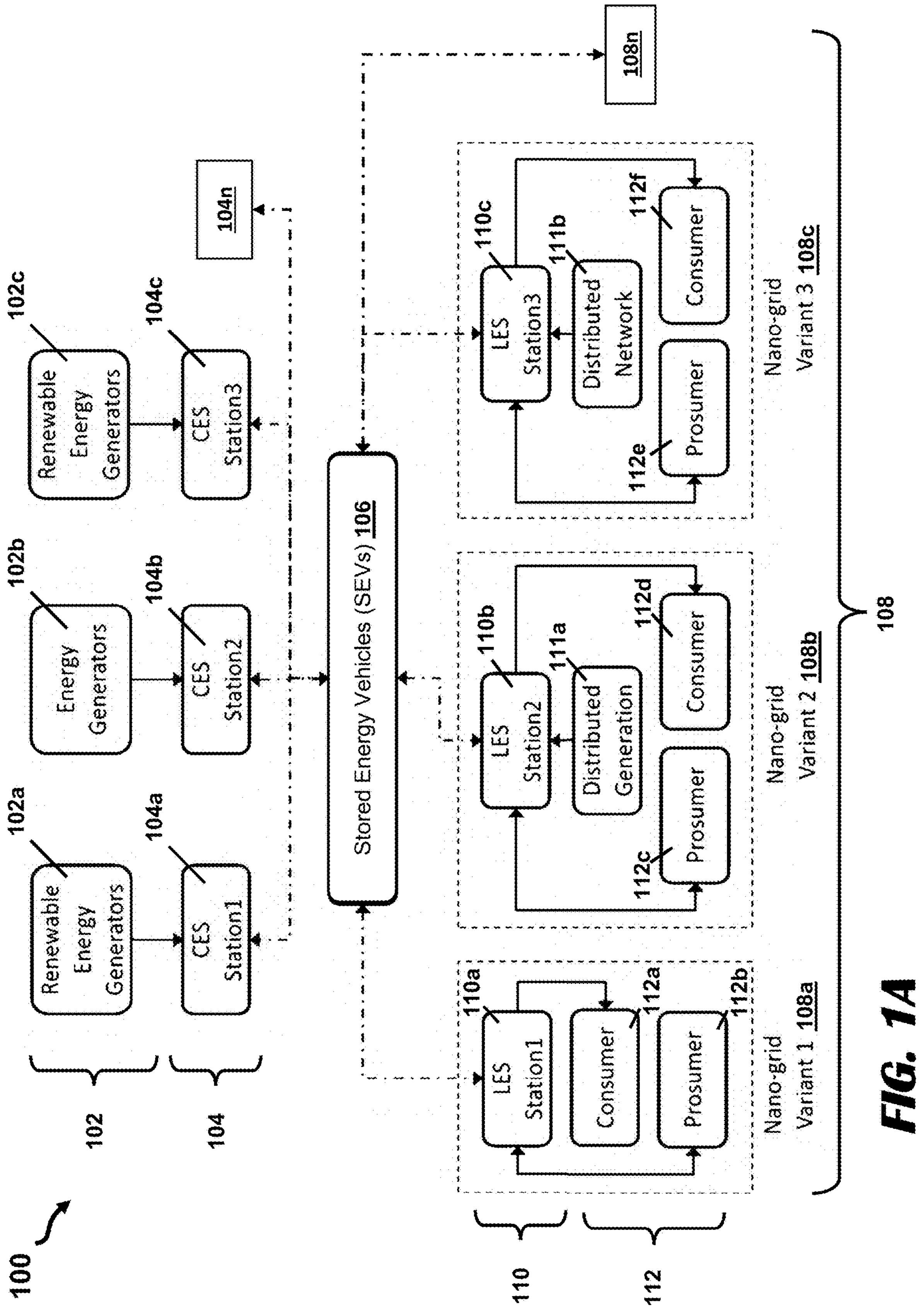
FIGS. 1A-1F show block diagrams for systems implementing a mobile electric grid (MEG) including nano-grid subsystems, according to one or more embodiments.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Generally, described herein is an enhanced electricity grid architecture that includes various technologies for sending electrical power from various energy storage stations to various micro-grid or nano-grid systems. In some cases, energy production or energy storage stations and the nano-grid systems are not electrically wired to each other (e.g., air gap), through embodiments include hardware and software components to monitor, manage, and enable energy exchanges; particularly for determining and managing instances when the nano-grid systems currently need a specific amount of the electrical power or are forecasted to need the specific amount of the electrical power by a specific time/date. For example, a system can include a grid-control server (e.g., application, virtual), a plurality energy storage station client computers (energy supply client), a plurality of vehicle client computers (manned or unmanned), and a plurality of nano-grid client computers (energy demand client and/or prosumers), where the grid-control server is in real-time communication with energy storage station client computers, the vehicle client computers, and the nano-grid client computers.

Each of the vehicles associated with the vehicle client computers carries a payload of a vehicle energy appliance, including a rechargeable battery or a bank of rechargeable batteries. The vehicle client indicates or receives instructions related to whether the rechargeable battery or the bank of rechargeable batteries is involved or not involved in energizing movements of the vehicle client (e.g., charging or discharging energy). The server receives various energy data or energy information regarding, for example, state of charge or energy supply (e.g., current or forecasted capacity, technical characteristics, location, local current or forecasted weather, local current or forecasted traffic conditions) from the energy storage station clients. The server receives various vehicle information (e.g., type, technical characteristics, current travel range, locations, routes, local current or forecasted or on-route weather, local current or forecasted or on-route traffic conditions) and vehicle energy data, such as energy storage information (e.g., capacity, current charge level, time to recharge) from the vehicle clients. The server receives various energy data or information on energy demand (e.g., amount currently available, state of charge, energy requirement, specific energy amount needed, time/date when specific amount needed, local current forecasted weather, local current or forecasted traffic conditions).

Based on such information, the server is programmed to receive requests from the nano-grid clients requesting specific amounts of electrical energy by specific times/dates (temporal factor). As such, based on such information, the server is programmed to formulate optimized and scheduled routes for the vehicle clients to travel to the energy storage station clients (e.g., miles, tens of miles, hundreds of miles) and the vehicle energy storage appliance (e.g., batteries) of the vehicle clients with the electrical energy from the energy storage station clients. Further, based on such information, the server is programmed to formulate optimized and scheduled routes for the vehicle clients to travel from the energy storage station clients, after the batteries of the vehicle clients are charged via the energy storage station clients, to the nano-grid clients in order to timely deliver the electrical energy for discharging from the batteries of the vehicle clients responsive to the requests sent to the server from the nano-grid clients. Additionally or alternatively, vehicle clients may additionally deliver electrical energy between the local energy storage stations of various nano-grid clients. Such deliveries (between nano-grids) may be based on computationally determined factors, such as charge levels of the vehicle clients, charge levels of the local energy storage stations (of the respective nano-grids), and/or temporal factors.

Embodiments described herein may include an electricity grid architecture—a Mobile Electric Grid (MEG) that achieves availability, reliability, and flexibility of electricity supply, without a need for extensive wired distribution networks and associated transformer stations. The MEG involves an approach to reliably supply electrical energy to consumers, while minimizing or eliminating a need for static power lines between various energy storage stations and various nano-grid systems. This approach can be a data driven electric grid that matches real-time and forecasted energy demand with real-time and forecasted energy supply.

Embodiments further include hardware and software components of one or more grid adapters that couple electrical components and manage the distribution and quality of power moving in and out of distribution networks or grids. A grid adapter's hardware and software achieve a set of functionalities for operations for allocating and distributing power amongst components a distributed power system.

Non-limiting examples of the functionalities, benefits, or advantages of a grid adapter include:

- A grid adapter may mitigate or eliminate the penetration of high frequency harmonics arising from EV charging stations and inverter-based DERs into the grid and therefore maintaining the power quality levels in the standard AC grid irrespective of the increased penetration of the power electronics-based systems in the nano-grid;
- A grid adapter may increase DER hosting capacity of a given feeder line or network of feeder lines;
- A grid adapter may enable the downstream micro-grid or nano-grid to act as a controllable balanced load from the grid's perspective;
- A grid adapter may provide the upstream grid with ancillary services like voltage and frequency support using HESS;

- A grid adapter may enable the downstream micro-grid or nano-grid to operate autonomously (isolated operation from the grid); and
- A grid adapter may provide the capability to exchange data with the distribution control center about the status of the micro-grid or nano-grid to permit the smart grid operations that rely on communication between different elements of the distribution grid. Any number of additional or alternative features, functions, and benefits may be achieved.

In some embodiments, a grid adapter enables air-gapping (or "islanding") downstream micro-grid systems and nano-grid systems for a wide range of time durations. This is achieved through a DC/DC converter of the grid adapter, connected to an energy storage system (ESS). In some cases, the DC/DC converter is connected to a stationary flow battery-based ESS, where a flow battery is charged and discharged through electrolyte swap. The flow battery ESS may be transported to and from the nano-grid systems by a SEV. As a result of this electrolyte swap, varying durations of energy supply can be achieved for the micro-grid and nano-grid through the grid adapter. The grid adapter and electrolyte swap approach facilitate flexible islanding durations that provides rapid and/or prolonged deployment and renewal of energy resources to remote nano-grids, which may be beneficial in supporting, for example, disaster relief for communities, backup power or reliability backstop for communities and businesses (especially for mining areas and oil and gas wells, and pumpjacks), among other uses.

The grid adapter and electrolyte swap approach also beneficially provide reduced energy exchange time. The power electronics and control software of the grid adapter reduces or eliminates the need for certain elements in an external ESS. A flow battery-based external ESS can accommodate electrolyte swap, which can reduce energy exchange (e.g., charging or discharging) times compared to ordinary energy exchanges or battery replacements. It should be appreciated that terms such as power, energy, and electricity, may be used in the context for describing certain functions or structures, though each term may generally refer to electrical commodity resources.

System Components and Architecture

FIGS. 1A-1F show various example embodiments of a MEG system 100, including variants of subsystems. FIG. 1A is a block diagram showing components of the MEG system 100, including the various subsystems, which may include various charging stations, central energy storage (CES) stations **104*a*-104*n* (generally referred to as CES stations 104), and nano-grid systems 108*a*-108*n* (generally referred to as nano-grids 108**), where the subsystems may communicate electrical power or data.

The system 100 may include one or more distribution networks **111*a*, 111*b* (generally referred to as distribution networks 111) including hardware and software components for distributing energy from sources to destinations. In some cases, a distribution network 111 includes hardware and software components of, or coupled to, a CES station 104, LES station 110, or non-grid 108. A distribution network 111** may include a low voltage (LV) distribution networks, Mid Voltage (MV) distribution network, or a Low/Mid Voltage (LV/MV) distribution network.

As shown in FIG. 1A, the MEG 100 comprises one or more energy generators 102, one or more central energy storage (CES) stations 104, one or more stored energy vehicles (SEVs) 106, and one or more nano-grids 108. The example MEG system 100 includes several variants of nano-grids 108.

The MEG 100 can include a system of stationary and mobile hardware that manage, control, and deliver a reliable supply of electricity to end-consumers 112 within a given geographical area. One or more computing devices, such as servers or other forms of computing devices (e.g., personal computer, laptop computer, tablet), may execute software (referred to herein as "MEG controller" or "controller") that receives data from a variety of input sources in order to control and manage operation of components of the MEG 100. The computer-executed MEG controller may include, or operationally communicate with, a demand controller software component that monitors and acquires data on energy consumed by the end-consumers 112 and controls specific electric loads available to particular end-consumers 112.

In some implementations, the demand controller of the MEG controller may control loads according to artificial intelligence forecasted needs, in accordance with instructions from each end-consumer 112, and/or in accordance with instructions from a Mobile Grid Control Centre (MGCC). The artificial intelligence operations may be trained on various types of historical energy data that the MEG controller receives from various data sources. During a training phase for the artificial intelligence, values of the historical data are translated and converted into training feature vectors that are fed into the artificial intelligence engine. The MEG controller then applies the one or more layers of the artificial intelligence on the training vectors to train the various parameters of the layers. During a testing phase (sometimes referred to as "deployment" or "inference time"), the MEG controller receives corresponding types of data, then translates and converts the data into a test vector that is fed into the artificial intelligence. The artificial intelligence engine then outputs, for example, the desired forecast or predicted energy needs, shortcomings, or surpluses.

The computing devices, as used herein, may include any device having hardware (e.g., processor, programmable logic controller) and software capable of performing the various functions and features described herein, such as controllers (not shown) comprising executable controller software for controlling operations of various subsystems of the MEG 100.

The controllers receive data from various data sources to perform various processes and tasks for the subsystems, where the data sources include the components of the subsystems and external data sources (e.g., weather servers hosting meteorological data). The processes include, for example, monitoring energy data, determining energy shortfalls or surpluses, and managing the various subsystems (e.g., nano-grids 108, LES stations 110).

The controllers that manage, for example, the generators 102 and CES stations 104 may monitor and issue instruction for energy generation, storage, output. For instance, the controllers may manage power converters of renewable energy generators **102*a*, 102*c* (e.g., wind generators, solar generators), which typically require the power converters in order to output maximum power with the acceptable quality in a stable manner. Operating the power converters may require constant data monitoring. The controllers comprise and execute software algorithms to ensure stable energy output. For example, a wind farm may produce a spike in voltage due to a spike in wind. A controller monitoring the wind generator may detect the voltage spike and immediately determine and issue instructions for performing a corrective action. The corrective action may include instructing the renewable generator 102*a*, 102*c* to dial down the amount of power generated or by modulating the reactive power produced. Additionally or alternatively, rather than reducing the power generated, the corrective action could include sending the surplus energy to one or more energy appliances at the subsystems of the MEG 100. The controller can determine to send the additional energy to the one or more energy storage appliances and store the energy for later discharge at another time. The controllers described herein affirmatively control any variable energy generation within the MEG 100 and maintain stability across the MEG 100**, whereas most conventional electrical grid monitoring software solutions rely upon the grid components to maintain stability. Using the vehicle delivery and controller-based determinations, the electrical energy is delivered to end-consumers over various distances while maintaining predictable amounts of energy, without, for example, the need for transmission lines and power transformers.

In some implementations, the vehicle computing device monitors a state of charge of a vehicle storage device. The vehicle computing device may instruct the vehicle storage device to charge or discharge, or swap, a predetermined amount of energy at one or more nano-grids 108. In some cases, the vehicle computing device manages and controls the amount of voltage or energy such that the predetermined amount of energy is not increased (or stepped up) for delivery to each geographic location of the one or more nano-grids 108.

An energy generator 102 is a system of hardware and software components that generate electricity, operationally managed by one or more computer-executed software controllers. An energy generator 102 may be any size and operate at any scale and may implement any form of electricity generation (e.g., natural gas, coal, nuclear). In some instances, an energy generator 102 is a renewable energy generator 102*a*, such as a wind or solar power generating system. An energy generator 102 may be standalone (e.g., "air gapped"), connected to one or more additional energy generators 102, or connected to a wider power grid. The end-consumers 112 of the MEG 100 system can include any of residential, commercial, and industrial electricity consumers, or any combination thereof.

Figure 1B:
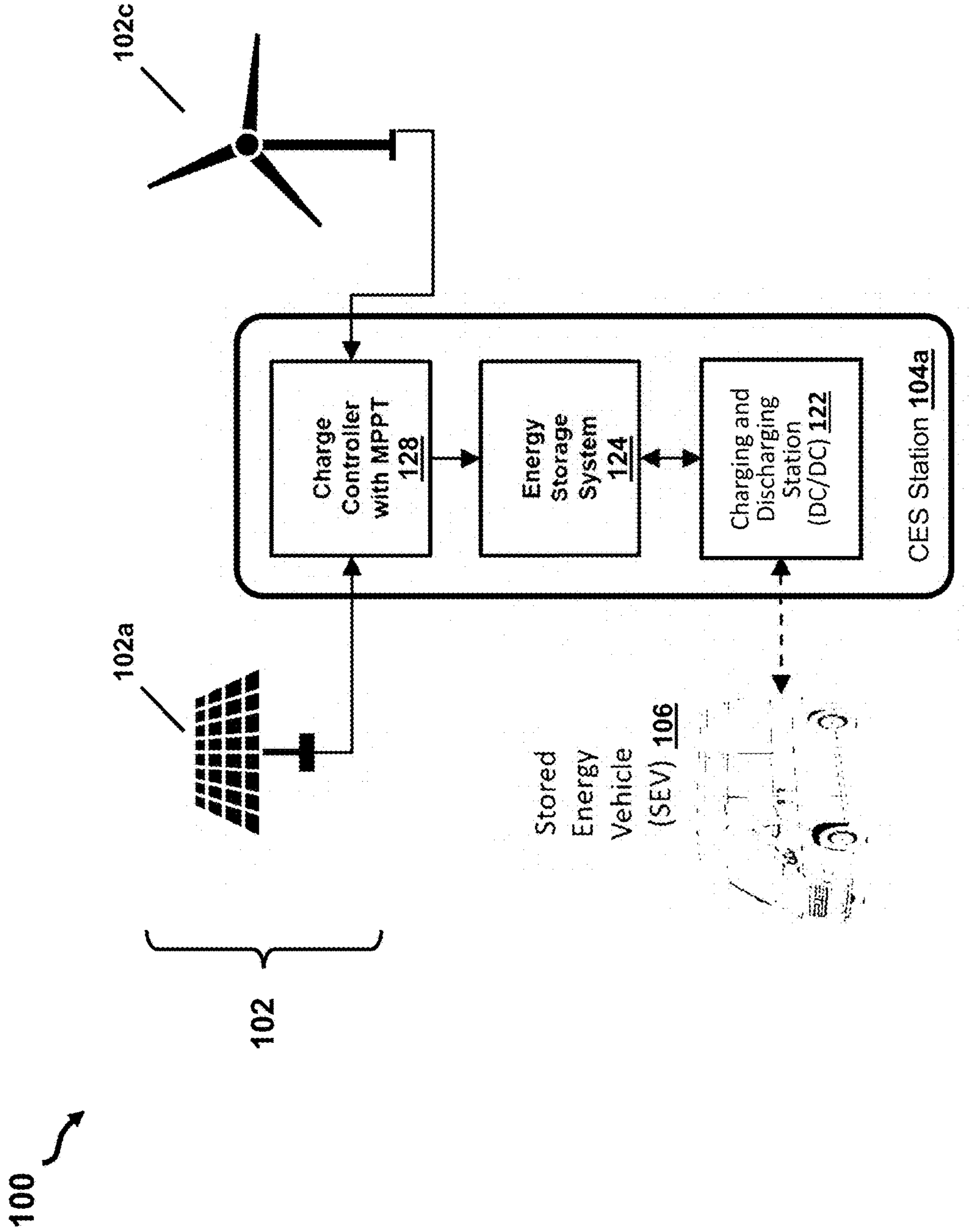

CES stations 104 store electricity generated by one or more energy generators 102. The CES 104 may be collocated with, or remote from, a generator 102 system. As shown in FIG. 1B, a CES 104*a* includes a CES controller 128, a charge and discharge station 122, and a main energy storage system 124. A main energy storage system 124 includes hardware components for storing electricity loads generated by corresponding energy generators 102, which may be renewable energy generators 102*a*, 102*c* electrically coupled to the CES 104*a*. The charge and discharge station 122 manages and handles energy moving from the storage system 124 to the SEV 106 or from the SEV 106 to the storage system 124. The CES controller 128 includes hardware and software components for controlling the movement and distribution of the electricity loads between the generators 102, storage system 124, and/or the SEV 106.

Figure 1C:
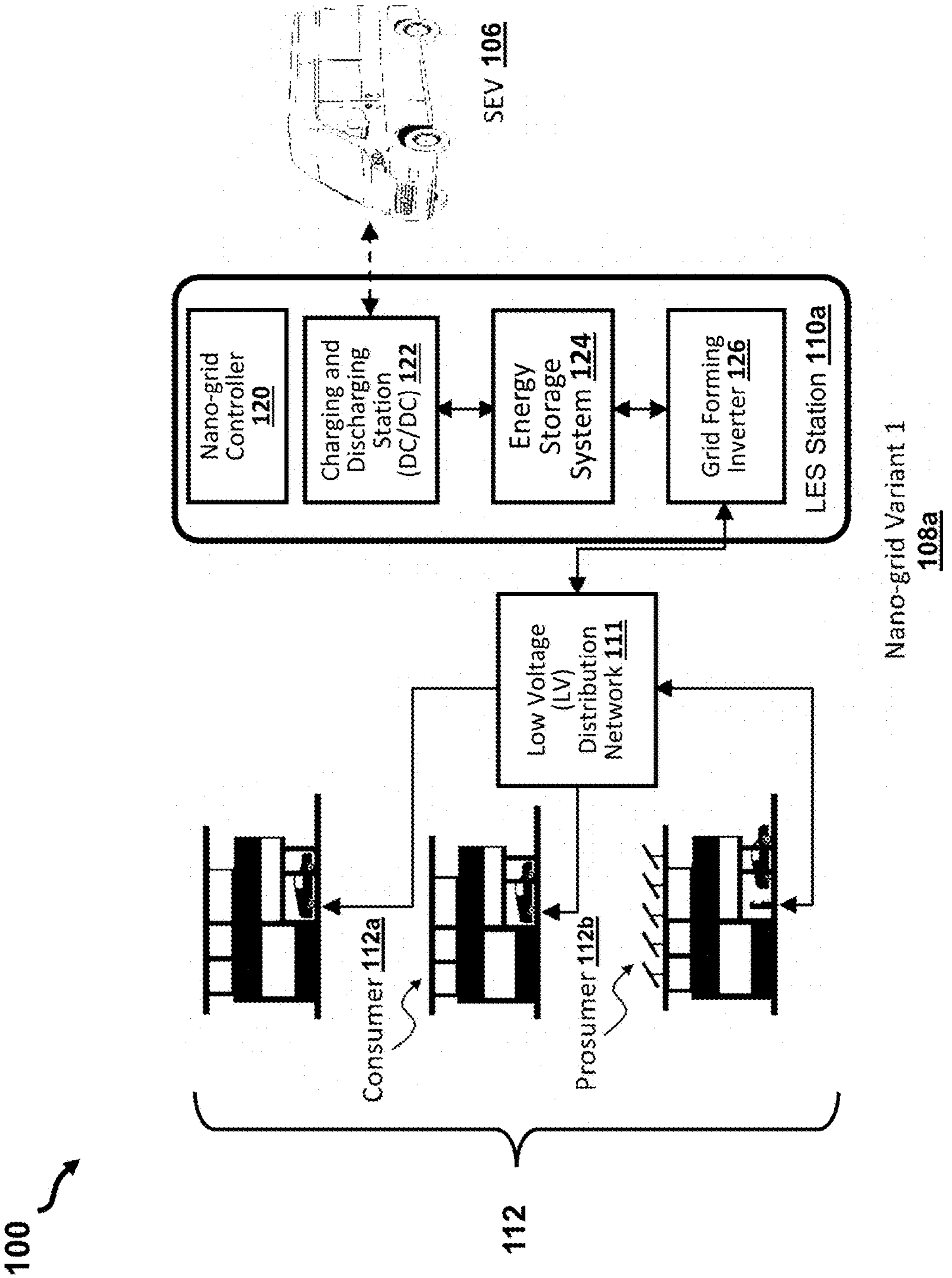
Figure 1D:
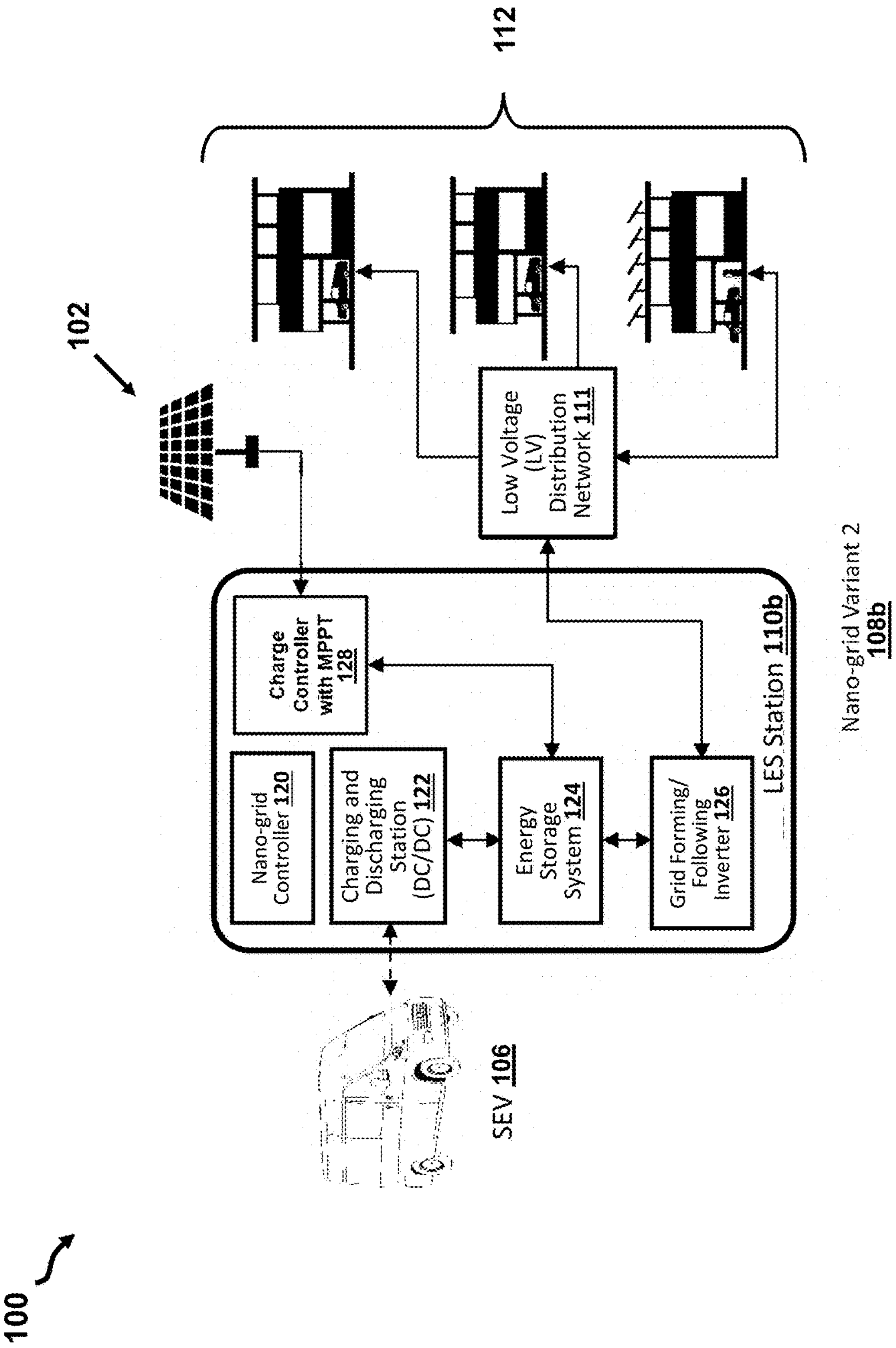
Figure 1E:
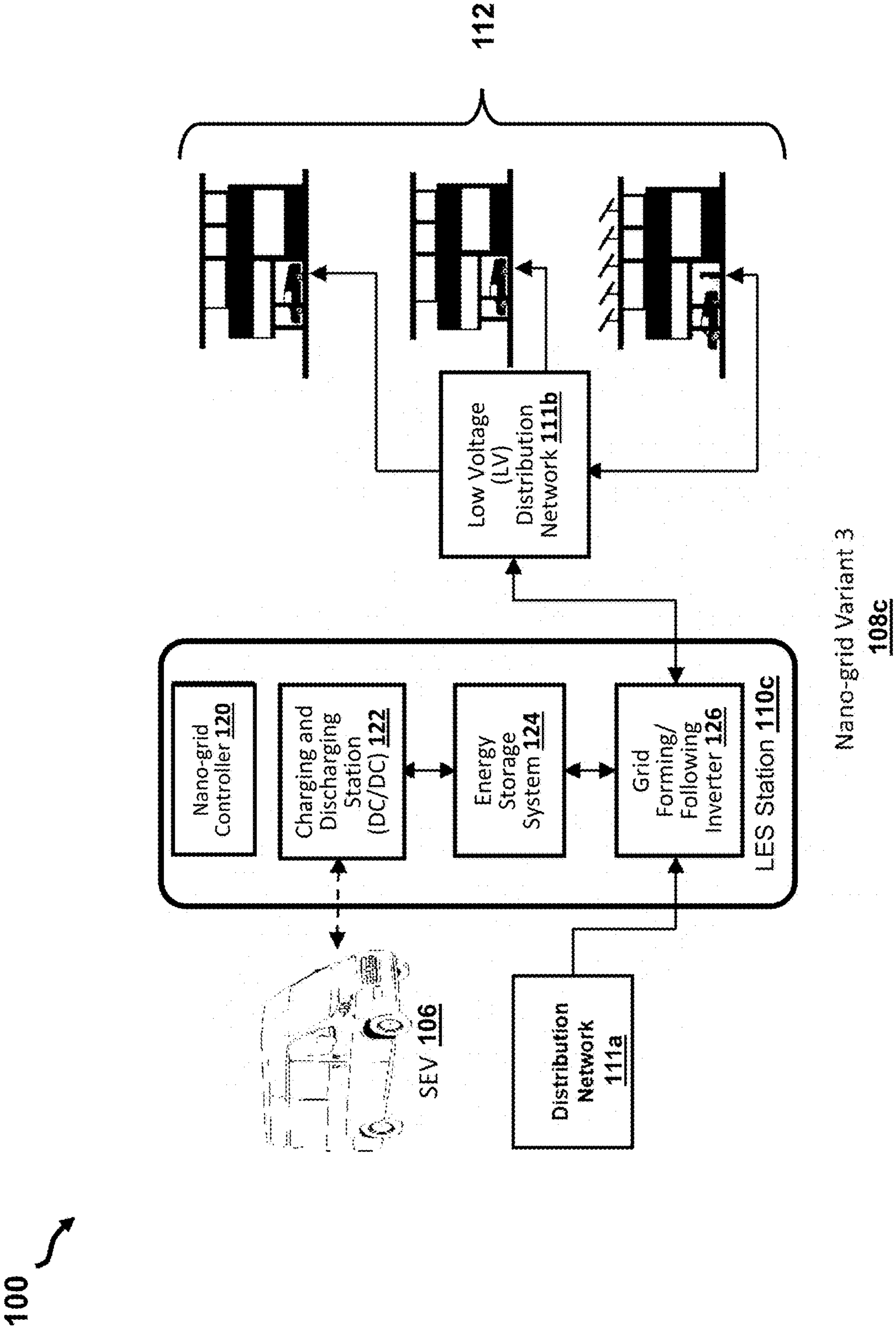

Local Energy Storage (LES) stations 110 store electricity for one or more nano-grids 108. As shown in FIGS. 1C-1E, each LES 110 includes an energy storage station system 124 that is located within or collocated with a corresponding nano-grid 108, and includes energy storage devices 124 (e.g., batteries) and a grid forming/following inverter 126 (e.g., direct-to-alternating current). In some instances, an LES 110 includes an electricity charge and discharge station 122 to interface with the SEVs 106 to be compliant with a desired amount of energy for service delivery goals. It should be appreciated that electric delivery to an LES 110 may be accomplished through one or more methods and mediums. For instance, electric delivery to an LES 110 may be accomplished through the charge and discharge station 122 as mentioned. But in some circumstances, the electric delivery may also be accomplished through replacement or swapping of depleted battery storage devices within the LES 108. In these circumstances, battery payloads may be carried by the SEV 106.

A Mobile Grid Control Centre (MGCC) (not shown in FIGS. 1A-1F) can include a control room within a building, an underground facility, a mobile facility (e.g., truck, bus, boat, airplane), or a data center that houses command and control software and personnel who monitor and operate the MEG 100 for a designated geographical area. The computing devices of the MGCC, such as data center servers and/or other computing devices (e.g., personal computers, laptop computers, tablets), may be communicatively coupled over one or more public or private networks to computing devices of the MEG 100 system, such as servers that execute controllers for controlling energy generators 102. The MGCC computing devices may receive various data inputs, such as energy data (e.g., present or historic state of charge; present or historic energy consumption) and store the data into servers of the MGCC data center. The MGCC computing device may transmit instructions and data updates to the various computing devices in the MEG 100 system. The instructions may be automatically generated by controller-executed algorithms or may be inputted by an administrative user via a GUI of a user's computing client device.

The nano-grid 108 can include a collection of one or more (e.g., two, three, four, or more) end-consumers 112*a*-112*f* (generally referred to as end-consumers 112), which may be consumers 112*d*, 112*f* or prosumers 112*c*, 112*e*, where prosumers are a type of end-consumer 112 with an ability to self-generate (e.g., solar, wind) part or all of the prosumer's electrical energy needs. End-consumers 112 may be collocated within a geographical boundary (e.g., geographic region/area) and connected to a LES station 110 through associated power electronics via high or low voltage distribution wires. In some cases, a nano-grid 108 can be an electrical island that is not electrically wired to a conventional power grid.

The nano-grid 108 may have a computing device, such as a server, that executes nano-grid controller (NGC) 120 software, which can include energy management algorithms that maintains reliable supply of electricity for a given nano-grid 108 and monitors energy usage by end-consumers 112 of the nano-grid 108.

The MEG 100 system is serviced by one or more SEVs 106 in accordance with the instructions from devices of the MGCC. The SEVs 106 can include transport vehicles that carry stored electrical energy in batteries for recharge/discharge delivery between various CES 104 and LES stations 110. The SEVs 106 can be land vehicles (e.g., cars, buses, trucks), aerial vehicles, or marine vehicles, whether manned or unmanned, whether autonomous or non-autonomous. The land vehicles can be powered via internal combustion engines or batteries and can include bidirectional electric or hybrid vehicles. In some implementations, SEVs 106 can be automatically or manually scheduled by one or more devices of the MEG system 100 to charge/discharge specific amounts of electrical energy from their batteries at the CES stations 104 or the LES stations 110.

In operation, the servers execute one or more controllers of the MEG system 100 that establish a data driven electric grid, matching real-time and forecasted energy demand with real-time and forecasted energy supply. To achieve this matchmaking, the MEG system 100 includes computer-executed controllers at each level of the MEG system 100 that include data acquisition and analyses, machine learning and deep learning algorithms, which determine the optimal uses for the various battery storage technologies, power generation electronics, and SEVs 106 that carry stored electrical energy. The MEG 100 is thus able to achieve a reliable and flexible electricity delivery system that meets at least some needs of the energy end-consumers 112, as the respective demands evolve. The MEG 100 represents a novel approach to deliver electricity in an informed and quantized manner.

The MEG 100 includes a network of nano-grids 108 whose stability is maintained by in-situ nano-grid controllers 120. Energy demand by end-consumers 112 (e.g., prosumers and consumers) connected to these nano-grids are met by in-situ generation and/or energy drawn from the LES stations 110 within the respective nano-grids 108, according to the nano-grid controllers 120. The LES stations 110 manage and provide energy supply for consumers 112*a*, 112*d*, 112*f* and energy supply and reliable backstop for prosumers 112*b*, 112*c*, 112*e*. The schedule and quantity of energy delivered, via the SEVs 106, to the LES stations 110 of the nano-grids 108 is determined and scheduled automatically and/or manually by computing devices executing controller software at the MGCC, taking into consideration demand forecast for both prosumers 112*b*, 112*c*, 112*e* and consumers 112*a*, 112*d*, 112*f* in the nano-grids 108 and available energy resources at the CES stations 104. The MEG system 100 may include redundancies in the form of additional storage capacity at the LES stations 110 to account for any delayed or missed delivery by the SEVs 106.

Each of the LES stations 110 includes a grid-forming inverter to control (at least some) power quality delivered to the end-consumers 112. Stationary energy storage systems 124 may be located at charging stations 122 and at the SEV 106 interface to the nano-grids 108. The SEVs 106 may include mobile energy storage systems, onboard the SEVs 106, which may have different characteristics and requirements from the energy storage systems 124 of the CES stations 104 or the LES stations 110.

The mobile energy storage systems of SEVs 106 can include payload systems (e.g., payload batteries) and operational systems (e.g., car batteries). The payload systems include those mobile energy storage systems and components of an SEV 106 employed for electric delivery (e.g., payload system, payload battery) and charge or discharge, according to power data and power requirements. The operational systems include those mobile energy storage systems and components involved in operations of the SEVs 106. In some cases, the payload systems of the SEV 106 are electrically, structurally, and operationally distinct from the operational systems of the SEV 106. And in some cases, the payload systems of an SEV 106 are not operationally separate and distinct from the operational systems involved in the operations of the SEV 106. In some embodiments, the payload system of the SEV 106 and the energy storage systems include one or more flow batteries or electrolyte fluid tanks for electrolyte swap, where the flow battery of payload system of the SEV 106 may charge or discharge through the electrolyte swap according to the power data and power requirements.

The system 100 includes various energy storage systems, such as an energy storage system 124 of the nano-grid 108, the energy storage system 124 of the LES station 110, the energy storage system 124 of the CES station 104, and the mobile energy storage system of the SEV 106, among others. The structure and operating theory of the various energy storage systems may vary based on the types of energy storage system implemented. Non-limiting examples of the energy storage systems may include flow batteries, lithium-ion batteries, and lead-acid batteries, among others.

The controller software executed by the various servers continuously monitor the types of electricity storage systems to ensure the state of health to achieve a predictable cost of electricity over a certain duration.

Figure 1F:
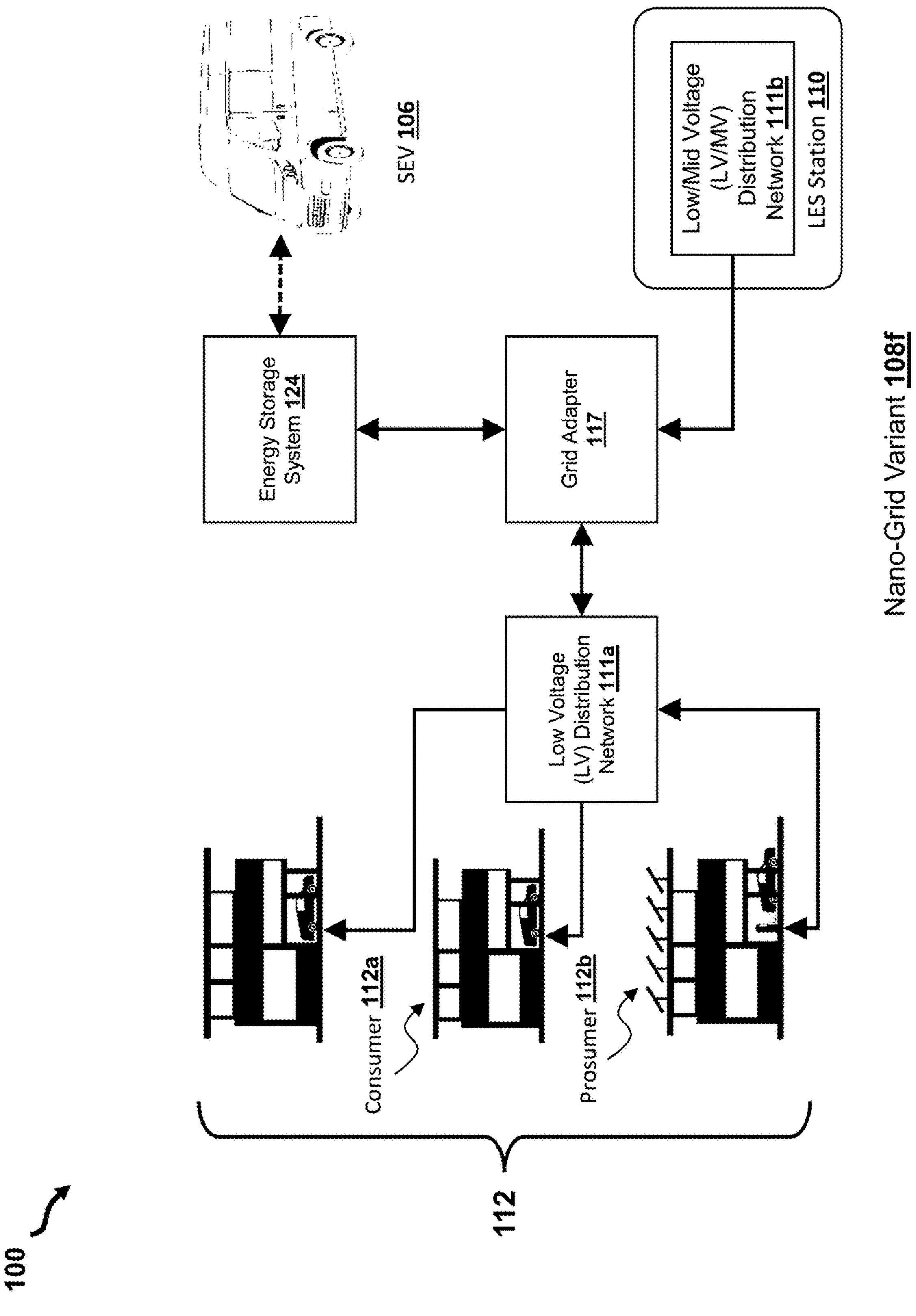

FIG. 1F shows an example system 100 including a non-grid variant 108*f* that implements a grid adapter 117, as described herein, for energy management, exchange, and storage. As shown in FIG. 1F, the grid adapter 117 is coupled to the LES 110 including or coupled to one or more distribution networks 111 (e.g., LV distribution network, LV/MV distribution network), and to an energy storage station system 124 that is located within or collocated with the corresponding nano-grid 108*f*, where the energy storage system includes one or more energy storage devices 124 (e.g., batteries). In some instances, the energy storage system 124 includes an interface with the SEVs 106 to be compliant with a desired amount of energy for service delivery goals.

It should be appreciated that electric delivery to an LES 110 may be accomplished through one or more methods and mediums. For instance, electric delivery to an LES 110 may be accomplished through the charge and discharge station 122 as mentioned. In some circumstances, the electric delivery may also be accomplished through replacement or swapping of depleted battery storage devices within the LES 108. In these circumstances, battery payloads may be carried by the SEV 106. And in some circumstances, the electric delivery may also be accomplished through electrolyte swap between flow batteries of an SEV 106 and depleted battery storage devices within the LES 108.

The grid adapter 117 includes hardware and software components that facilitate air-gapped (or "islanding") downstream micro-grid and nano-grids for a wide range of time durations. The grid adapter 117 further facilitates interchange between the distribution networks 111 and the energy storage station system 124. This may be achieved through a DC/DC converter (not shown) or other hardware components of the grid adapter 117 that connects the distribution networks 111 to the storage system 124.

In some embodiments, the storage system 124 includes a stationary flow battery-based interface and battery structure, which is charged and discharged through electrolyte swap that is transported by the SEV 106.

Figure 2:
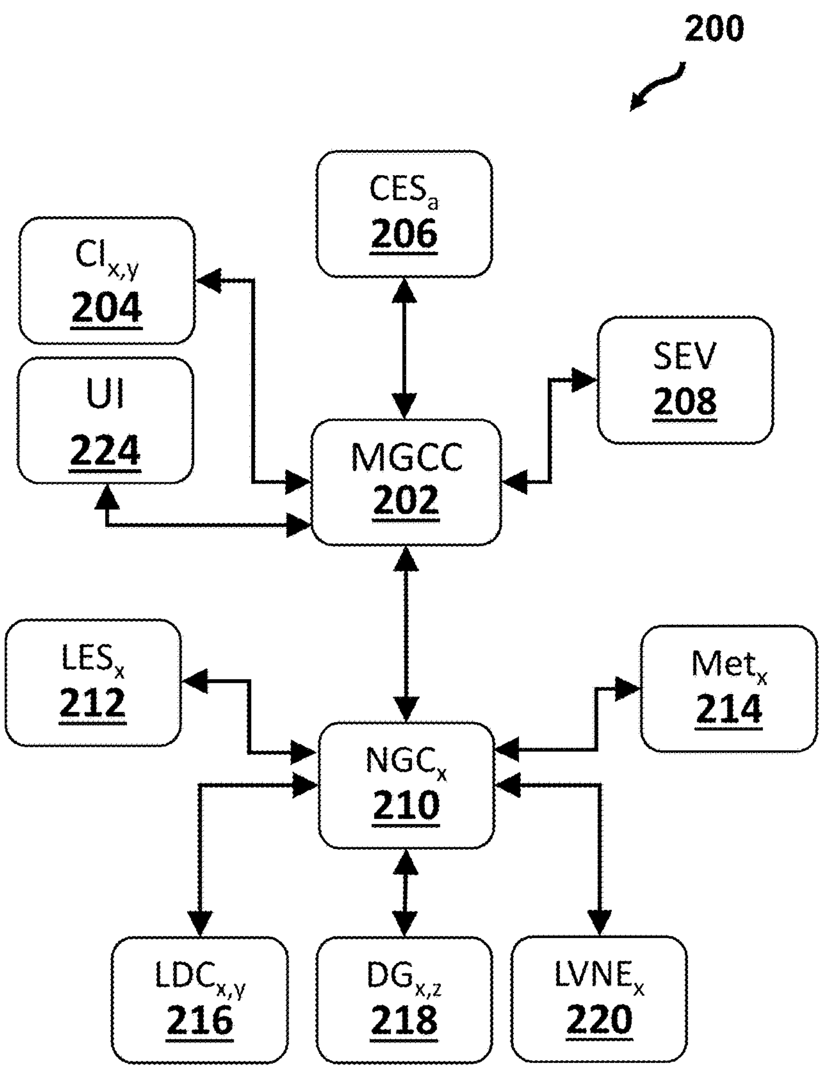
FIG. 2 shows components for communication and control hierarchy of a MEG system, according to an embodiment.

FIG. 2 shows components for communication and control hierarchy of a MEG system 200, according to an embodiment. The MEG system 200 includes various subsystems comprising servers that execute controller software for controlling operations of the particular subsystems, such as a MEG controller (of the MGCC 202) or nano-grid controllers (NGC 209), among others. The MEG system 200 comprises a control and communication network architecture hosting data communications between the various subsystems of the MEG system 200.

The network architecture includes various hardware and software components of one or more public or private networks that interconnect the various subsystem components of the MEG system 200. Non-limiting examples of such communications networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The control of the MEG system 200 relies on a centralized concept to operate the MEG system 200 in an efficient and secure manner, where the MEG system 200 is operationally controlled by the one or more servers that execute the software controllers located at each subsystem. The controllers receive and evaluate information for governing the operations of the subsystems, such as operational data for generators, geographic information for the various subsystem locations, energy storage indicating inventory at given locations, amounts of energy in transit, historical and forecasted energy consumption, weather forecast (e.g., meteorological data 214), and the like.

A local demand controller (LDC) 216 and NGC 210, at a nano-grid or at power generator, may be configured to allow a safe and reliable operation of the network, even under a loss of a communication network.

Servers (or other computing devices) at the MGCC 202 may supervise some, most, or all operations of the MEG system 200 to allow an optimal utilization of various available energy resources while maximizing a needed level of power quality to the consumers and prosumers. For instance, the server of the MGCC 202 sends set-points to CES stations 206 and coordinates with the CES stations 204 to issue the commands to the SEVs 208 to charge/discharge certain amounts of electricity, to achieve the various set goals of the MEG system 200. In some implementations, the servers of the MGCC 202 receive from the servers of the CES stations 206 the status and health conditions of the particular CES stations 204. The server of the MGCC 202 evaluates the status, health conditions, and operational details to ensure the reliable and safe operation of these subsystems.

The CES stations 204 communicate (e.g., wirelessly, wired) with the LES stations 210 to dispatch and control operations of the LES stations 210, while ensuring safe and reliable conditions. The LES stations 212 communicate (e.g., wirelessly, wired) with the NGCs 209 to exchange set-points and monitoring information.

The NGC 210 of the nano-grid enables various operations of a low voltage (LV) distribution network including home controllers, distributed generation controllers and network elements to achieve some, many, most, or all goals for a safe and reliable operation of the nano-grid. The NGC 210 includes various distribution management system capabilities, such as Network Connectivity Analysis, State Estimation, Volt-VAR Control, Load Shedding Application, Load and Generation Forecasting, Feeder reconfiguration, Fault Management, and System Restoration, Demand-Side Management (DSM), or others. These capabilities can help the MEG system 200 to achieve various goals, such as increase system reliability, reduce outage duration, increase system efficiency, improve power quality indices, increase integration of renewable energy sources, enhance asset management, reduce operations and maintenance costs, or others.

In some embodiments, the NGC 210 includes functions and features of a grid adapter controller of a grid adapter described herein. In some embodiments, the system 200 includes a grid adapter having a grid adapter controller (not shown) distinct from the nano-grid and the NGC 210.

The MGCC 202 evaluates various types of data inputs from various data sources. For instance, servers of the MGCC 202 evaluate and model energy data from of various utility systems 224 and other subsystems of the MEG 200. Non-limiting examples of the data inputs include: real-time and planned geographic locations of SEVs 208; real-time and forecasted SoC for the SEVs 208 in a geographical boundary (e.g., region of service); real-time and forecasted surplus or shortfall of energy at LESs 212 for given NGCs 210; real-time and forecasted SoC at CESs 206; consumption indicators from consumers connected to the NGCs 210, which may indicate forecasted reduction in electricity consumption for a given monetary or non-monetary credit (consumer incentive) for a defined forward-looking period; consumption and production indicators from a utility system 224 indicating forecasted amounts of energy to supply or absorb for a given price (utility system 224 incentive) at a particular LES station 212 connected to the MEG 200; and production indicators from a generator indicating amounts of energy to supply for a given price (generator incentive) to a CES station 206.

The MGCC 202 executes controllers to receive and/or determine the real-time and forecasted parameters from grid adapter controllers, LDCs 216, NGCs 210, SEVs 208, and CES 206. The MGCC 202 may forecast and/or identify shortfall or surplus electricity at various subsystems of the MEG 200 based on the data inputs from various data sources (e.g., subsystem inputs, database 408) and/or based on the virtual mobile power plant (VMPP) model outputs. The MGCC 202 may determine certain subsystems to charge/discharge electricity to achieve balance and appropriate amounts of electricity at the subsystems of the MEG 200 and transmits machine-readable charge/discharge instructions or human-readable instructions (e.g., incentives) to, for example, consumers, generators, and utility system 224. Upon determining how to achieve energy balance across the MEG 200 using, for example, price commitments and credits, the MGCC 202 determines the schedule and delivery routes of the SEV 208 fleet to achieve energy balance of the overall MEG 200 with the lowest cost of operation for given time steps.

Figure 3:
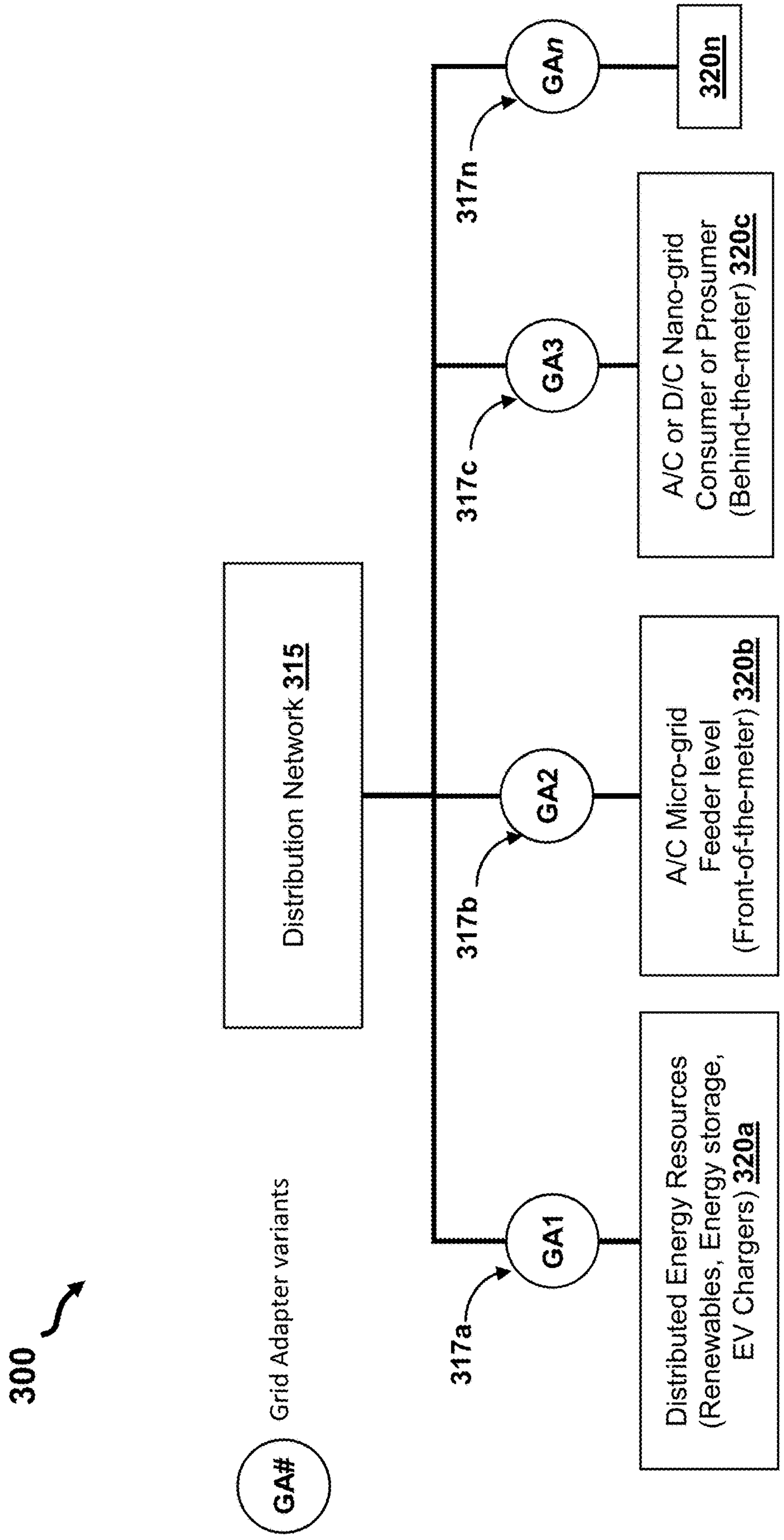
FIG. 3 depicts a system including various implementation use cases of grid adapter variants and implementation areas, according to an embodiment.

FIG. 3 depicts a system 300 including variants of grid adapters 317*a*-317*n* (generally referred to as grid adapters 217) for various implementation use cases and implementation areas. The system 300 includes an upstream distribution networks 315 or grids coupled to various energy subsystems 320*a*-320*n* (generally referred to as energy subsystems 320) via corresponding grid adapters 317.

A grid adapter 317 is an integrated system of hardware and software that prevents voltage violations, harmonic pollution, and low frequency oscillations from permeating across distribution network 315 due to increasing uptake of various types of energy subsystems 320, such as electric vehicle (EV) stations and Distributed Energy Resources (DERs), which are often used to supplement or enhance the traditional centralized power generation and distribution infrastructure (e.g., solar panels, wind turbines). The grid adapter 317 provides these functions by decoupling the structures and operations of the energy subsystems 320 (e.g., DERs, EV stations) from the structures, operations, management, and control of the distribution networks 315 or grids. The grid adapters 317 can be deployed at various locations on the distribution network 315 or grid to facilitate restriction-free adoption of the new forms of energy subsystems 320 (e.g., DERs, EV-stations) in manner that provides smooth and reliable power system operation to the energy subsystems 320 and other entities of the system 300, including generators, consumers and prosumers alike. As an example, a first grid adapter 317*a* variant can be deployed and collocated with DER equipment 320*a*, such as energy storage system, renewable energy generation, or EV charging stations. As another example, a second grid adapter 317*b* variant can be deployed upstream of a designated micro-grid 320*b* for a given feeder line or a network of feeder lines. As another example, a third grid adapter 317*c* variant can also be deployed at a nano-grid 320*c*, behind-the-meter, for individual electricity consumers or prosumers connected to the distribution network 315 or grid in the form of the nano-grid 320*c* subsystem.

Figure 4:
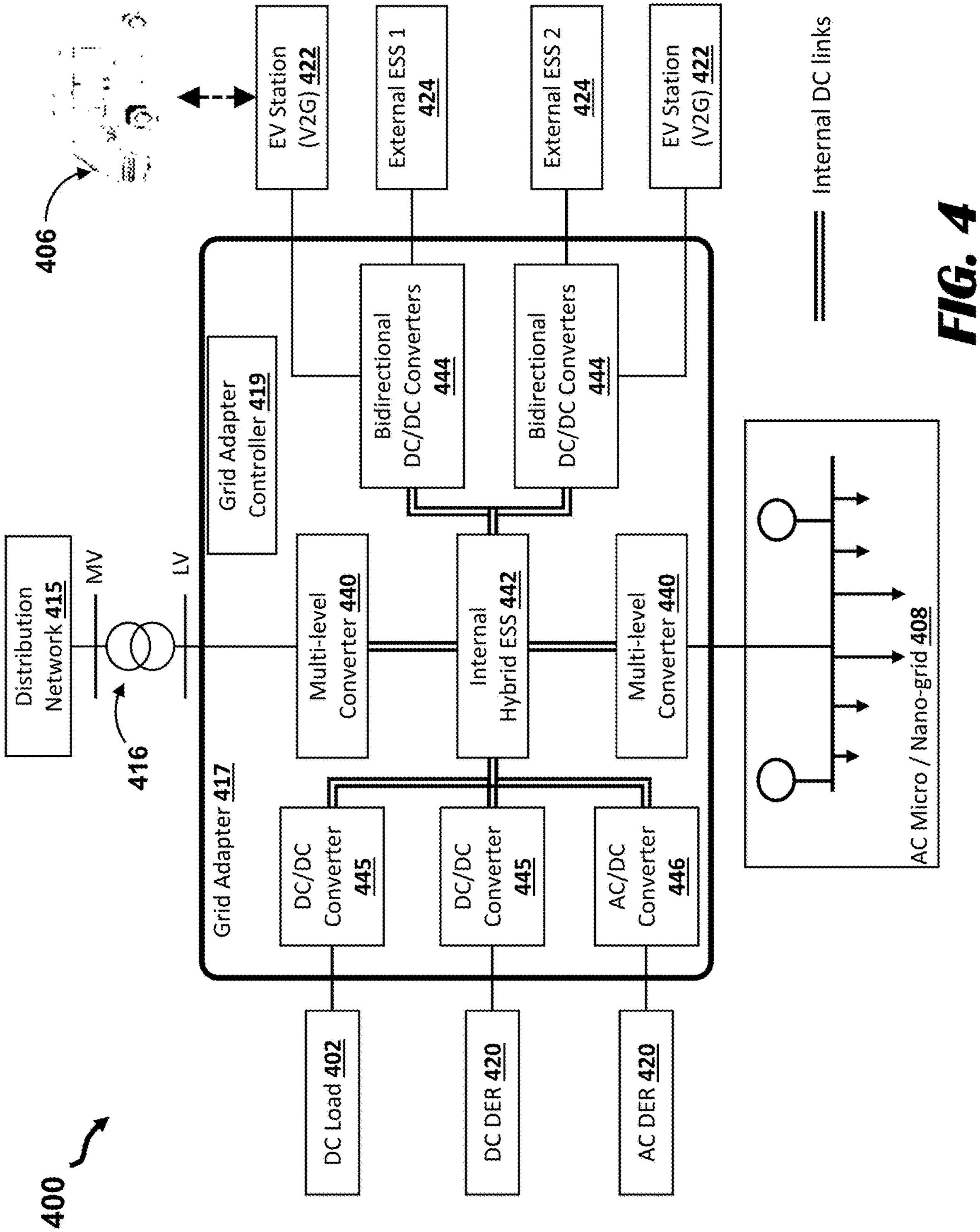
FIG. 4 shows a general architecture of the grid adapter, including different power electronic stages and a hybrid energy storage system (HESS), according to an embodiment.

FIG. 4 shows components of a system 400 and particularly depicts various components of a general architecture of a grid adapter 417. The system 400 includes electronic source systems (shown as a DC load 402), an upstream distribution network 415 (e.g., MV/LV distribution network 111*b* in FIG. 1F), target electronic systems, such as DERs 420 (e.g., AC DER, DC DER), nano-grids 408, EV stations 422 that couple to SEVs 406, and external electrical storage systems (ESSs 424) situated at, for example, end-consumer locations or remote storage locations.

The grid adapter's 417 hardware includes a combination of energy storage technologies and power electronics. The grid adapter 417 includes power-processing units for different power electronic stages and a hybrid electrical storage system (HESS), including an internal HESS 442. As used herein, "power electronic stage," "converter stage," and similar terms known in the art, each refer to a power-processing unit based on electronics devices needed to perform the needed power processing, such as changing a voltage waveform from Alternating current (AC) to Direct current (DC). The power processing units of the grid adapter include, for example, DC/DC converts 445, AC/DC converters 446, multi-level converters 440, and bidirectional converters 444, among others. The specific combinations of the converters within the grid adapter will depend on the specific use case (e.g., FIGS. 5A-5C) for targeted application area in the distribution grid 415. The internal HESS 424 is connected to a set of unidirectional and bidirectional AC/DC converters 446 and DC/DC converters 445 through an internal DC link.

Each internal-facing DC side of the converters 440, 444, 445, 446 is connected to the internal HESS 442 and the corresponding external-facing AC side or DC side of the converters 440, 444, 445, 446 are connected to devices external to the grid adapter 417, such as the electronic the DC load 402, the DERs 420 (e.g., AC DER, DC DER), the nano-grids 308, the EV stations 422 that couple to SEVs 406, and the external ESSs 424. The interface with the upstream distribution network 415 is through a multi-level converter 440 or a bidirectional AC/DC converter to control the power flow with the upstream grid 415. In some cases, transformers 416 are situated between the grid adapter 417 and a distribution network 415. The transformers 416 may manage voltage of, for example, medium voltage (MV) or low voltage (LV), as needed. While the other power-processing units for the power electronic stages provide an interface with the other elements of, for example, the downstream nano-grid 408 including DC load 402, AC load (not shown), external ESS 424, EV charging stations 422, and DERs 420 (e.g., AC and DC DERs), which may be onsite or remote to the nano-grid 408.

Each processing unit of the converter stages and the internal HESS 442 may include a distinct local controller (not shown). The local controller includes software programming for managing the performance of the particular processing unit or internal HESS 442 and establishing and tracking reconfigurable set-points. In some implementations, the set-points or thresholds of the various local controllers may be received from a hierarchically higher level central controller, such as a grid adapter controller 419 or grid controller (not shown) of the distribution network 415, which configures and manages operations of the components of the grid adapter 417 in order to implement the needed energy management strategy (collectively the "Energy Management System" or "EMS"). This EMS optimizes the operation of the grid adapter based on the needs of the elements connected to the grid adapter, while complying with the utility distribution management system (DMS) requirements.

Figure 5A:
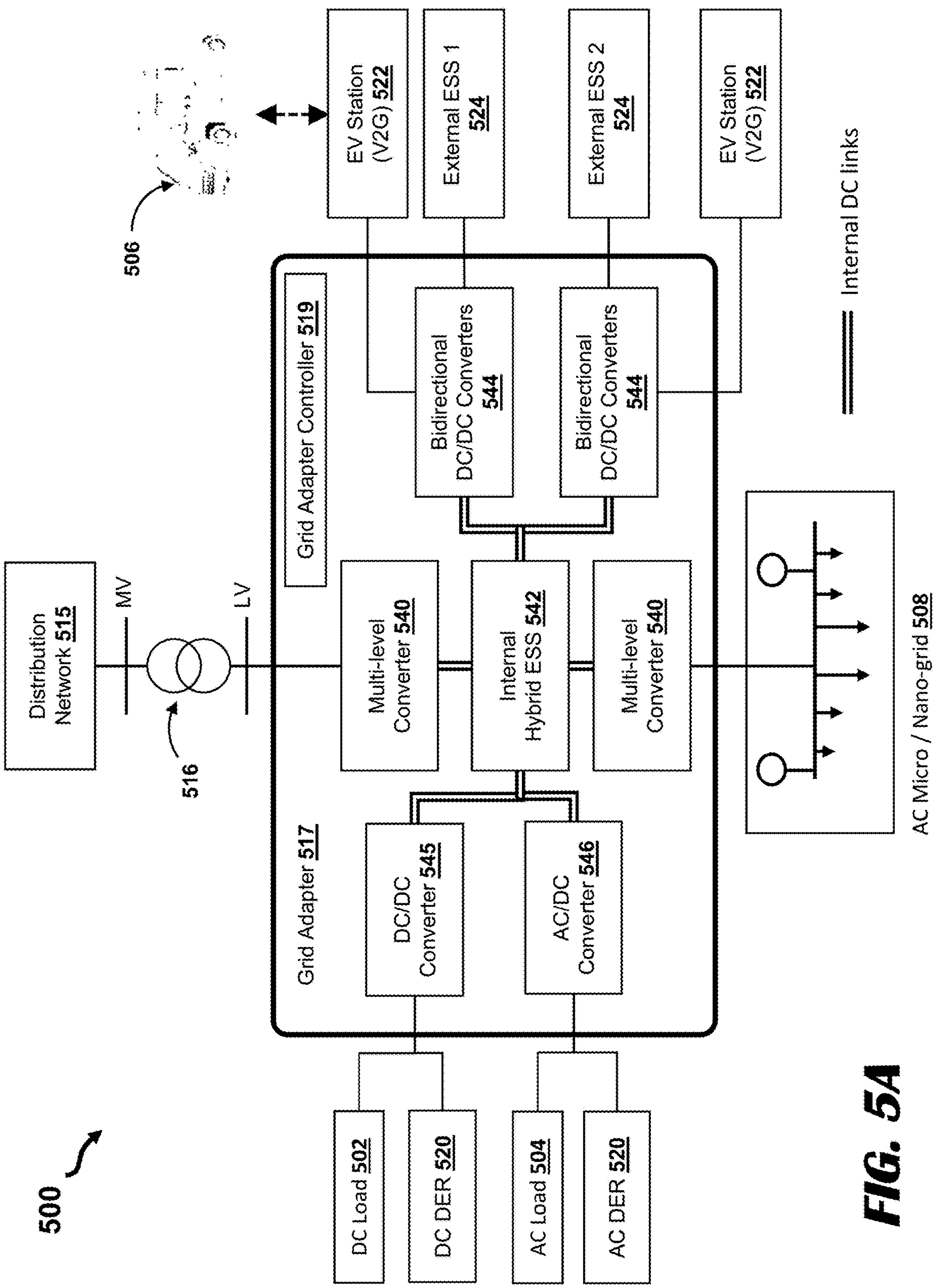
FIG. 5A shows a grid adapter collocated with and configured for Distributed Energy Resource (DER) equipment, according to an embodiment.
Figure 5B:
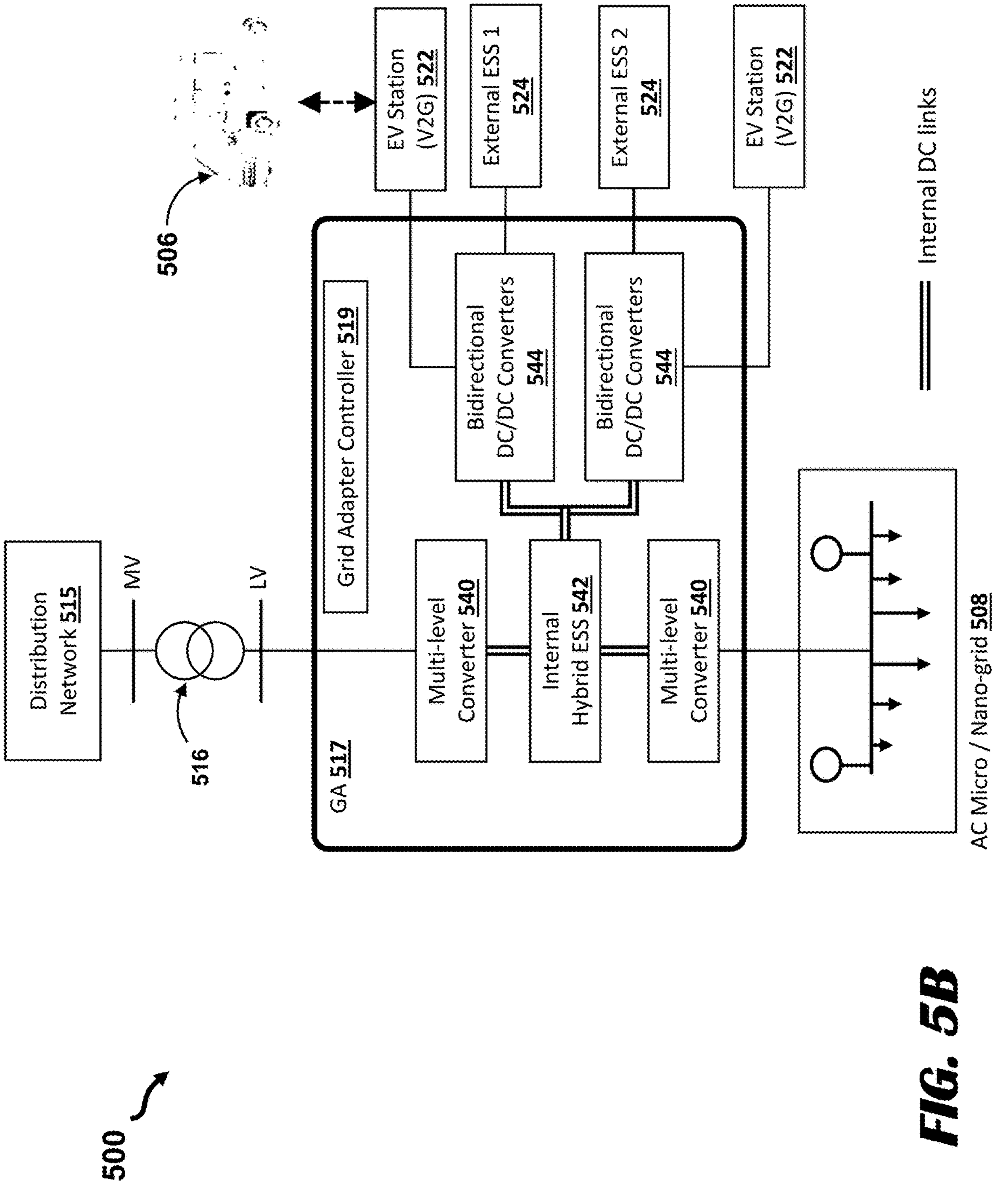
FIG. 5B shows a grid adapter collocated or remotely situated and configured for a managed or controllable micro-grid or nano-grid, according to an embodiment.
Figure 5C:
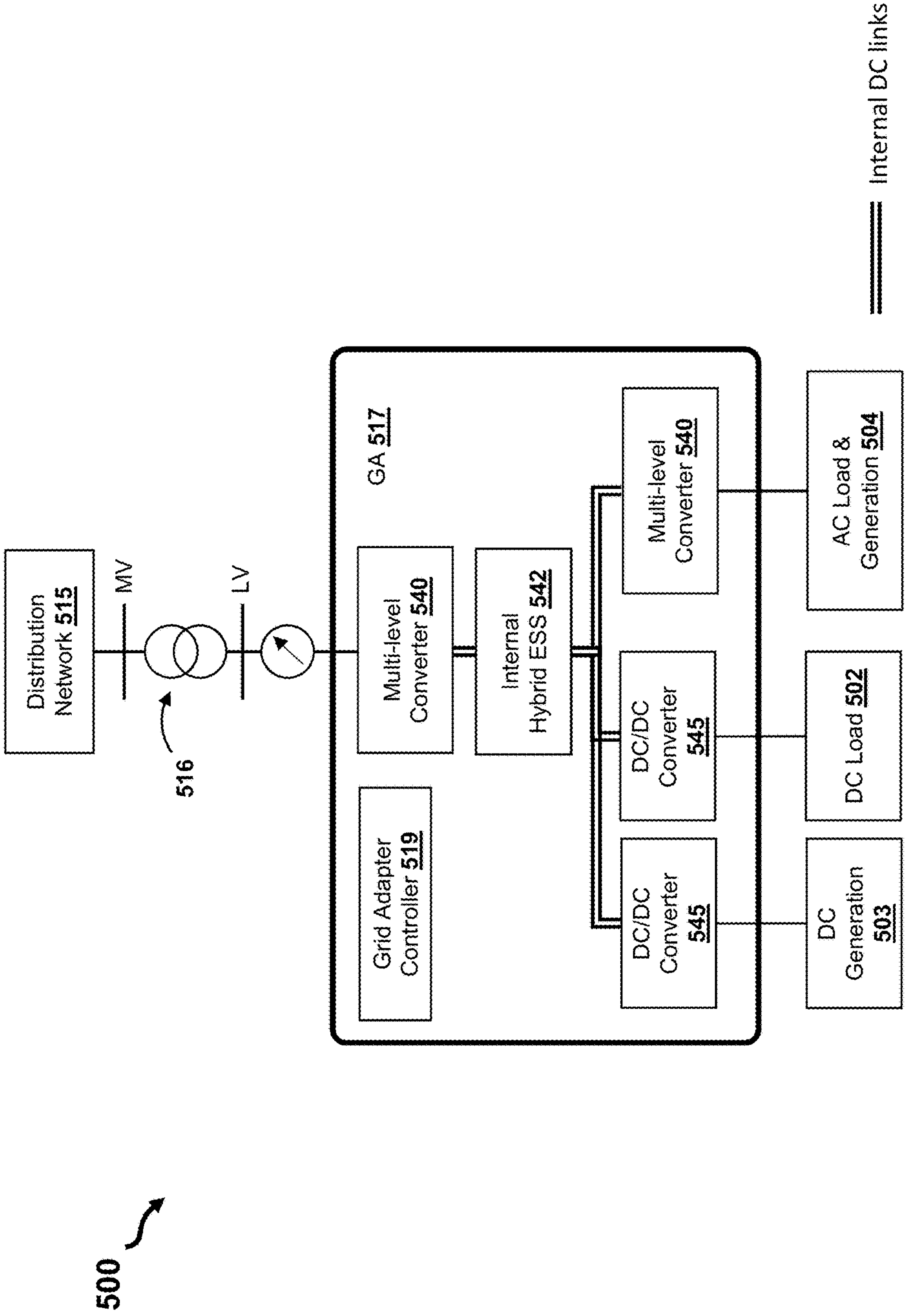
FIG. 5C shows a grid adapter collocated or remotely situated and configured for behind-the-meter consumers and prosumers as nano-grids, according to an embodiment.

FIGS. 5A-5C shows a system 500 with various architectures of a grid adapter 517 for various implementations and uses, according to example embodiments. The grid adapter 517 shown in FIGS. 5A-5C includes power processing units for power electronic stages and an internal HESS 542. In some cases, transformers 516 are situated between the grid adapter 517 and an upstream distribution network 515. Components of the system 500 are similar to those features and functions described in FIG. 4, and certain details need not be repeated in describing FIGS. 5A-5C.

As shown in FIG. 5A, the grid adapter 517 is collocated with, and configured for, receiving or sending power, to or from DER 520 equipment (e.g., DC DER, AC DER). The system 500 includes a distribution network 515 (e.g., MV/LV distribution network 111*b* in FIG. 1F), the DERs 520 (e.g., AC DER, DC DER), nano-grids 508, EV stations 522 that couple to SEVs 506, and external electrical storage systems (ESSs 524) situated at, for example, end-consumer locations or remote storage locations. The DER 520 may include subsystems comprising hardware and software components for supplementing distribution networks 515 or enhancing power generation and distribution infrastructures (e.g., solar panels, wind turbines). For a DC-based DER 520, the grid adapter 517 includes a DC/DC converter 545, having an external-facing DC interface and internal-facing DC interface, which converts or applies electronic stages to reduce harmonics or other noise on the electronic waveform of input electricity or output electricity. For an AC-based DER 520, the grid adapter 517 includes an AC/DC converter 546, having an external-facing AC interface and internal-facing DC interface, which converts or applies electronic stages to reduce harmonics or other noise on the electronic waveform of input electricity or output electricity.

For an AC load and generator 504, the grid adapter 517 includes a multi-level converter 540, having an external-facing AC interface and internal-facing DC interface, which converts or applies electronic stages to reduce harmonics or other noise on the electronic waveform of input electricity or output electricity. The grid adapter 517 includes the multi-level converter 540 to interface with the AC load and generator 504 or upstream AC distribution network 515. The multi-level converter 540 may exchange power between the upstream grid 515 or AC load and generator 504 and the DC-side of the grid adapter 517. The grid adapter controller 519 may reference a preconfigured or required power factor that ensures the power quality levels required on the upstream grid 515 or AC load and generator 504. Based upon the power factor, the grid adapter controller 519 monitors and controls the multi-level converter 540 to exchange the power with the upstream grid 515 or AC load and generator 504 having very high level of pure sinusoidal current.

The grid adapter 517 may mitigate or eliminate the penetration of high frequency harmonics arising from EV charging stations 522 and inverter-based DERs 520 into components of the system 500, such as nano-grids 508 or upstream distribution network 515. In some case, the grid adapter controller 519 monitors and controls the grid adapter 517 components to maintain preconfigured power quality levels in a grid system 500 (e.g., standard AC grid; DC grid) irrespective of the increased penetration of the power electronics-based systems in the nano-grid 508 or other sources of electricity flowing into the grid adapter 517. In some cases, the grid adapter controller 519 of the grid adapter 517 may increase the DER 520 hosting capacity of a given feeder line or network of feeder lines between the grid adapter 517 and the DER 520. Where the grid adapter 517 is collocated with a DER 520, the grid adapter controller 519 may be the same or distinct device and software programming as a local controller (not shown) of the DER 520.

FIG. 5B shows a grid adapter 517 collocated or remotely situated and configured for a managed or controllable micro-grid or nano-grid 508. The system 500 includes a distribution network 515 (e.g., MV/LV distribution network 111*b* in FIG. 1F), a nano-grid 508, EV stations 522 that couple to SEVs 506, and external electrical storage systems (ESSs 524). The grid adapter further includes a grid adapter controller 519. Where the grid adapter 517 is collocated with the nano-grid 508, the grid adapter controller 519 may be the same or distinct device and software programming as a nano-grid controller (not shown) of the nano-grid 508.

FIG. 5C shows a grid adapter collocated or remotely situated and configured for behind-the-meter systems of end-consumers (e.g., consumers and prosumers) as various types of subsystems, such as a DC generator 503, DC load 502, AC load and generator 504, nano-grids (not shown in FIG. 5C), among others. As shown in FIG. 5C, the grid adapter 517 may smooth harmonics or noise in electrical signals introduced into the system 500 from various energy source systems, such as the DC generator 503, DC load 502, or AC load and generator 504.

For a DC generator 503 or DC load 502, the grid adapter 517 includes a DC/DC converter 545, having an external-facing DC interface and internal-facing DC interface, which converts or applies electronic stages to reduce harmonics or other noise on the electronic waveform of input electricity or output electricity. For an AC load and generator 504, the grid adapter 517 includes a multi-level converter 540, having an external-facing AC interface and internal-facing DC interface, which converts or applies electronic stages to reduce harmonics or other noise on the electronic waveform of input electricity or output electricity. The grid adapter 517 includes the multi-level converter 540 to interface with the AC load and generator 504 or upstream AC distribution network 515. The multi-level converter 540 may exchange power between the upstream grid 515 or AC load and generator 504 and the DC-side of the grid adapter 517. The grid adapter controller 519 may reference a preconfigured or required power factor that ensures the power quality levels required on the upstream grid 515 or AC load and generator 504. Based upon the power factor, the grid adapter controller 519 monitors and controls the multi-level converter 540 to exchange the power with the upstream grid 515 or AC load and generator 504 having very high level of pure sinusoidal current.

Figure 6:
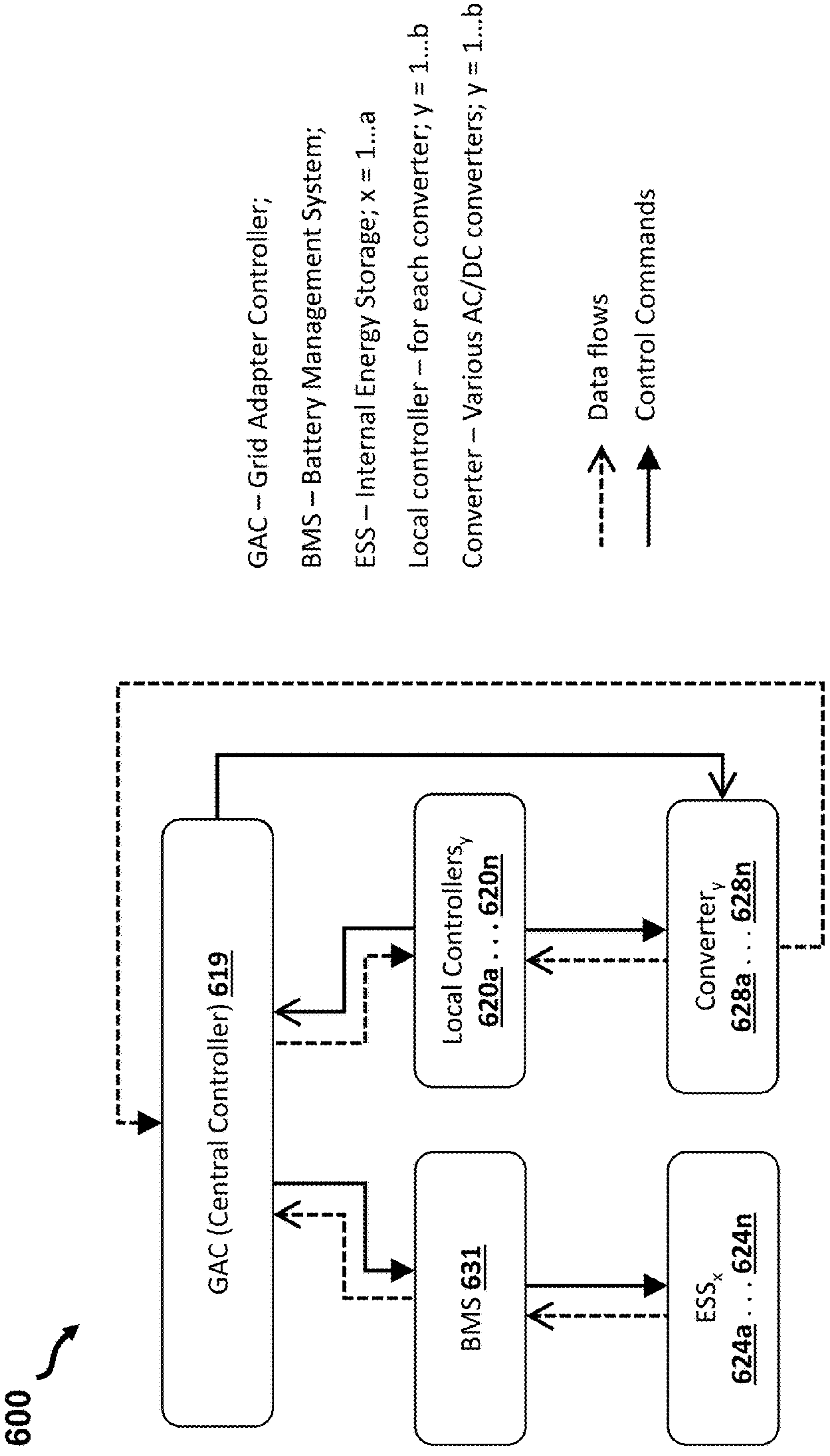
FIG. 6 shows a control system architecture of the grid adapter, according to an embodiment.

FIG. 6 shows a control system 600 architecture of a grid adapter. The system 600 includes a grid adapter Controller (referred to as GAC 619 or central controller of the grid adapter) and one or more local controllers 620*a*-620*n* (generally referred to as local controllers 620 or a local controller 620). The system 600 includes any number of internal ESSs 624*a*-624*n* (generally referred to as internal ESSs 624 or an internal ESS 624), a battery management system (BMS 631), and converters 628*a*-628*n* (generally referred to as converters 628 or a converter 628). In some embodiments, the GAC 619 and the local controllers 620 may be situated inside a same geographic location or cabinet, at the geographic location where the grid adapter would be situated.

The internal ESSs (e.g., internal HESS 442 of FIG. 4) of grid adapters include hardware and software components for storing power received from various upstream sources as internal-stored energy. The internal ESS 624 includes a controller, processor, or other logical devices that perform certain functions of the internal ESS 624 according to control commands containing executable instructions received from upstream or hierarchically higher controllers of the system 600. The internal ESS 624 may, for example, receive, store, and transfer power according to the control commands. The internal ESS 624 may receive the control commands from a BMS 631 or from the GAC 619. In some implementations, the controller, processor, or other logical device of the internal ESS 624 may monitor the functions and state of the internal ESS 624 to generate energy data containing the state information for the internal ESS 624. The internal ESS 624 transmits the energy data to the BMS 631 or to the GAC 619, which may reference the energy data obtained from various data sources when generating the control commands.

In some embodiments, the system 600 includes the BMS 631 comprising hardware and software components for monitoring the functions and states of internal ESSs 624 of one or more grid adapters of the system 600. The BMS 631 generates energy data containing the state information for one or more internal ESSs 624 and transmits the energy data to the GAC 619. The GAC 619 may reference the energy data obtained from the various data sources, including the BMS 631, when generating the control commands. The BMS 631 may receive the control commands from the GAC 619, which the BMS 631 then transmits to the appropriate internal ESS 624 based upon identifying information of the internal ESSs 624 within the control command.

The GAC 619 executes various software processes for managing operations of one or more grid adapters using energy received from various controllers or devices of the system 600 or in accordance with control commands received from local controllers 620 (e.g., LDC 216, NGC 210) other subsystems (e.g., LES station, CES station, distribution network, MGCC servers) of the system 600. The internal GAC 619 may determine, for example, amounts of energy inputs, energy conversion or output quality, and control commands for the components of the grid controller to perform. The GAC 619 then generates the control commands and transmits the control commands to the components of the grid adapter. receive, store, and transfer power according to the control commands. The GAC 619 may monitor the functions and states of the components of the grid adapter to generate energy data containing the state information of the grid adapter. The GAC 619 transmits the energy data to the local controllers 620 or other processing components (e.g., MGCC server), which may reference the energy data when generating further control commands.

In some cases, the GAC 619 may capture energy data or transmit control commands directly, to and from the converters 628, where such converters 628 are components of the grid adapter comprising the internal ESS 624. In some cases, where the converters 628 are components of a separate subsystem, the GAC 619 receives control commands from the local controller 620 of the particular subsystem.

Grid Adapter Mitigates Harmonics and Oscillations

Figure 7:
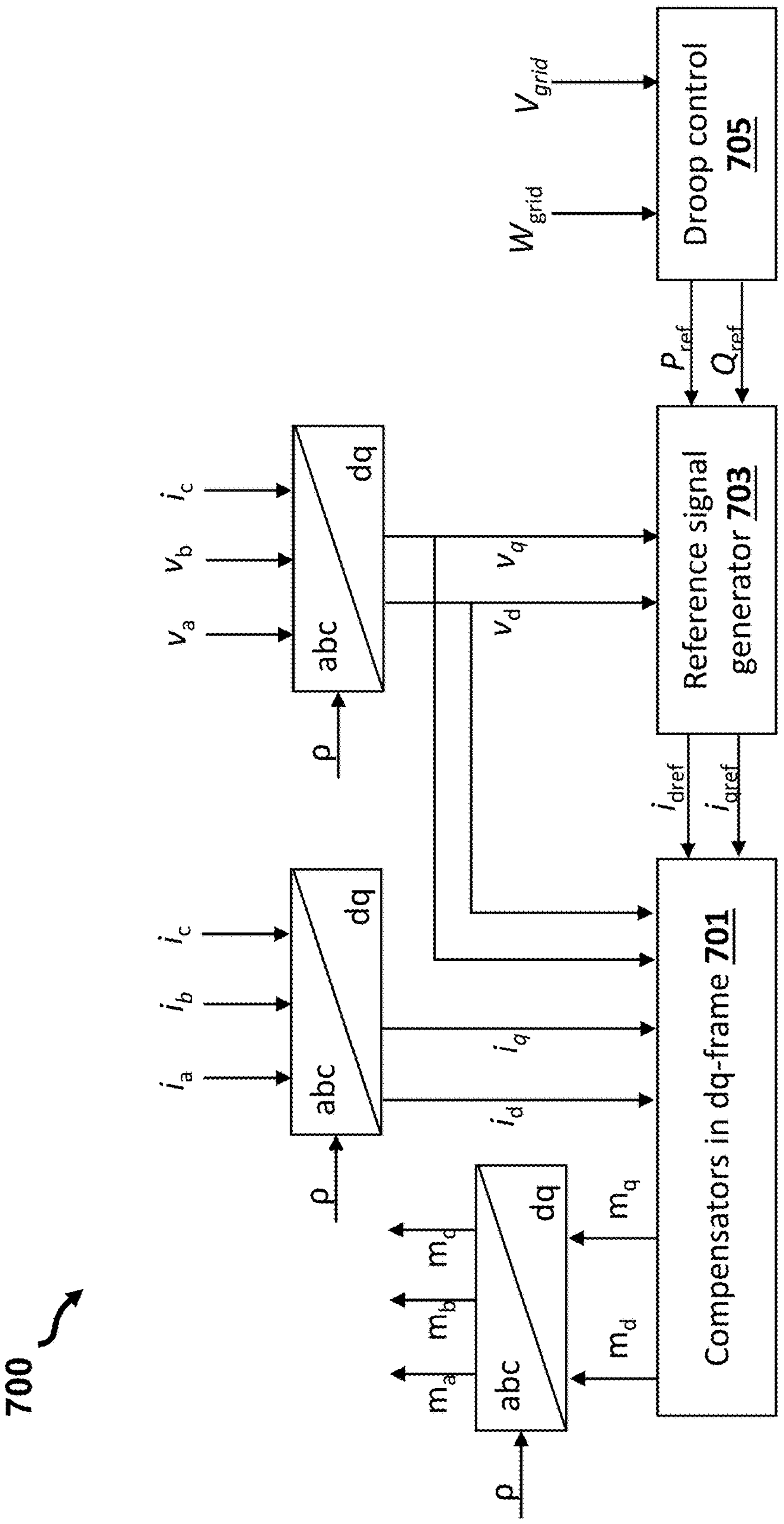
FIG. 7 shows a control block diagram for multi-level converter of a grid adapter, according to an embodiment.

FIG. 7 shows a control block diagram for multi-level converter of a grid adapter 700. High frequency harmonics distort the sinusoidal AC power of a distribution grid. This negatively impacts the operation of the power system materializing as faults in the protection relay operation, as an example. The grid adapter 700 includes power processing units (sometimes referred to as power electronics converters) that block unwanted harmonics in electrical signals, where the power processing units include a series of power conversion stages and controls over the sinusoidal AC power.

The grid adapter 700 uses the power electronics converters to decouple the upstream distribution grid from the downstream energy subsystem, which may include an external ESS, EV station, and DER stations. In this way, harmonics generated in the downstream grid are mitigated or eliminated, and prevented from penetrating in the upstream grid, and vice-versa.

In some implementations, the converters convert the AC voltage on the nano-grid side into DC and then back to AC on the distribution grid-side. In such implementations, the grid adapter 700 contains a multi-level converter to interface with the AC upstream distribution grid. This multi-level converter is able to exchange power between the upstream grid and the DC side of the grid adapter 700 with very high level of pure sinusoidal current with the required power factor to ensure the power quality levels required on the upstream grid.

In some cases, an internal ESS operates as an energy storage buffer between each side of the system 700. In this way, the grid adapter 700 may eliminate long-term disturbance in the voltage or frequency. The control of the multi-level converter is done to allow grid-following operation, where the converter is able to exchange the needed amount of power and reactive power with the upstream grid according to the needs of the downstream systems to maintain the balance between the generation elements and the load elements. This balance is achieved by maintaining the DC link voltage at the needed level according to the operation mode determined by the overall EMS.

The system 700 may include a compensator controller 701 (shown as "Compensators in dq-frame"). The compensatory controller is a special controller for achieving the required current within the converters. In some implementations, the compensator controller 701 implements a control technique known as "dq control."

The system 700 may include a reference signal generator 703. The reference signal generator 703 includes hardware and software components for performing various equations or functions that convert power-level setpoints into current setpoints.

The system 700 may include a droop controller 705. The droop controller 705 includes computing hardware and software performing a control technique in power systems where the power-level setpoint is changed automatically according to a frequency or voltage to support the grid. The droop controller 705 operations may be equivalent to proportional control.

Grid Adapter Increases Feeder Line Hosting Capacity

The grid adapter increases the feeder line capacity to host additional DERs by interfacing with an external ESS and coordinating physical delivery of electrical energy using SEVs. The additional DER capacity is determined by modeling and analyzing the quasi-static time-series behavior of existing feeder elements, SEV deliveries, and the proposed DERs with the grid adapter's central EMS. This approach unlocks a variable adoption rate of DERs and EVs downstream of the grid adapter, thus negating the need for utility operators to assess and upgrade distribution line multiple times when consumers purchase EVs, install EV stations, or deploy rooftop solar.

The DC/DC converter connected to a bidirectional charging station enables SEVs of a Mobile Electric Grid (MEG) to charge from, and discharge to, the ESS in the grid adapter. The SEV delivery of electricity ensures sufficient electrical energy is available for the feeder line or household for its forecasted needs. This in turn reduces the power draw from the distribution grid on the upstream side of the grid adapter.

This is in addition to an internal ESS, which is able to provide the energy to the EVs or loads, if needed, and also absorbs the excess energy from renewable energy resources or from the upstream grid during times of low tariff during the day.

Grid Adapter Creates Controllable Micro-Grids and Nano-Grids

Through the control of the different power electronics stages and the central EMS controller, the grid adapter is able to control the downstream grid to act as a controllable load or generator with pre-specified power set-point which can be related to the time of use tariff. Therefore, the grid adapter transforms the downstream grid into a micro-grid or nano-grid, which is then able to support the upstream grid and alleviate any congestions or overloading on some feeders in the distribution grid for example. Embodiments may implement a basic control philosophy, virtual power plant control, to achieve this functionality.

The virtual power plant control is a functionality that allows the grid adapter to operate as a controllable generator or load from the perspective of the grid. The grid adapter would be able to receive a setpoint from the grid operator to either supply certain amount or absorb certain amount of power. In some cases, the feeders of the network may be overloaded due to the increased loads therefore if the grid adapter is able to generate power and feed the loads in its vicinity then it will reduce the power on the coming feeder and this is considered to be alleviating the congestion.

Figure 8:
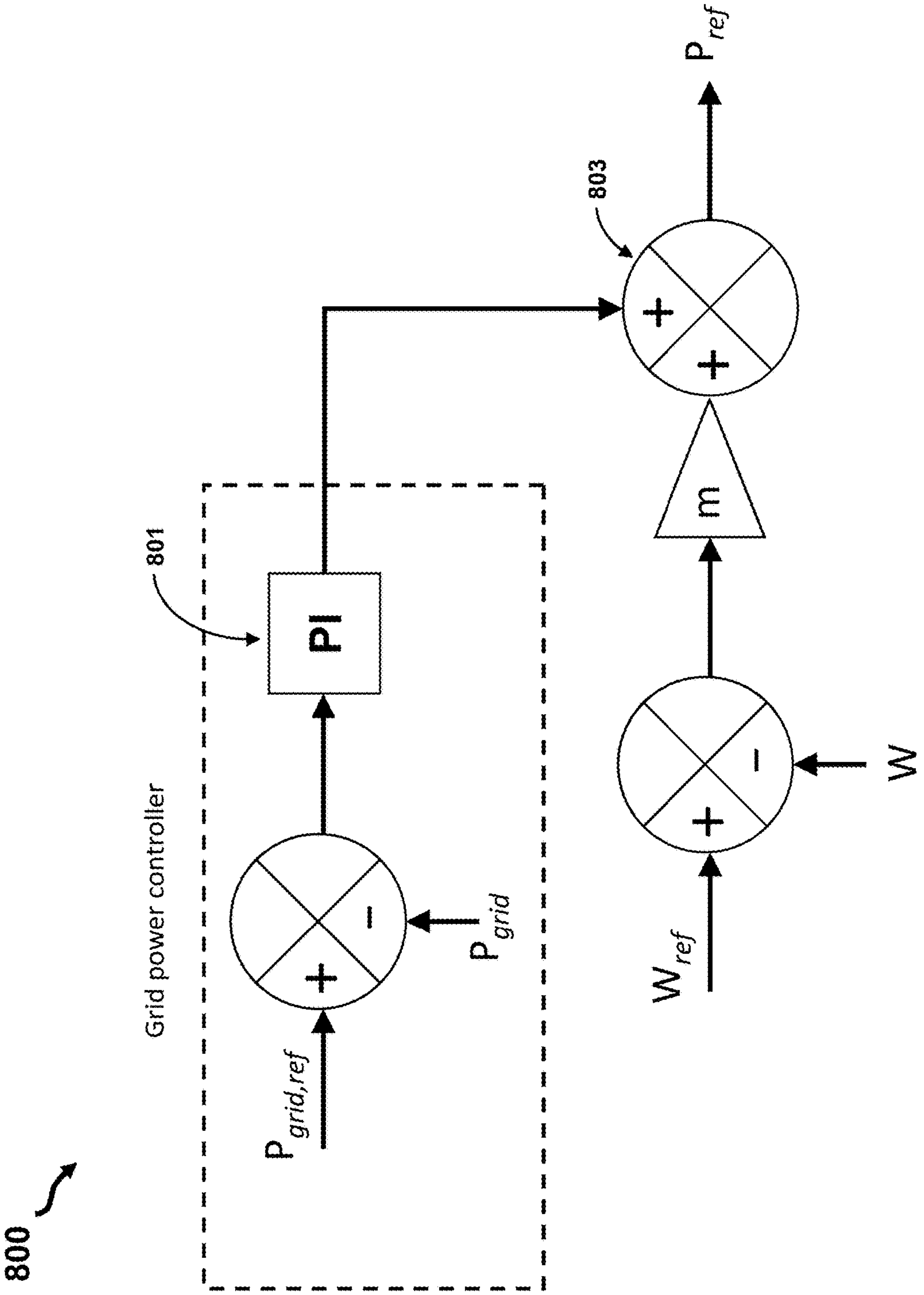
FIG. 8 shows an example of a virtual power plant control, according to an embodiment.

FIG. 8 shows control block diagram of a system 800 implementing a virtual power plant control. The system 800 includes a proportional/integral (PI) controller 801 operating the error between the setpoint (Pgrid, ref) and the actual signal measured (Pgrid). This controller 801 ensures zero error in steady state and therefore correct setpoint tracking. FIG. 8 also shows a frequency droop controller 803, which is a proportional controller operating to minimize the error between the frequency setpoint (Wref) and the actual measured one (Wgrid) to produce the power setpoint (Pref).

Grid Adapter Ensures the Required Power Quality

A combination of short duration storage such as super capacitors and lithium ion and longer duration storage, such as flow battery, address power quality behavior of varying timescales. As an example, super capacitors can smoothen the spike in power draw from multiple EV charging stations turning on at the same time or compensate the rapid drop in solar PV generation due to a passing cloud. Similarly, longer duration ESS (or HESS) can address diurnal and seasonal variation of energy demand for a feeder line. This is done through the control of the different AC/DC and DC/DC converters combined to achieve the balance between the generation and load even if the upstream grid is not available. The different power electronics stages have local-converter controllers to achieve either current control, voltage control, or power control. The local-converter controllers receive set-points from a high-level controller (EMS) to ensure the optimal operation of the system. Even in case the upstream grid is completely lost then the grid Adapter can form the downstream grid and provide the critical loads with the need power using the concept of autonomous control of the voltage source converters (VSCs), as in the example of illustrated in FIG. 9.

Figure 9:
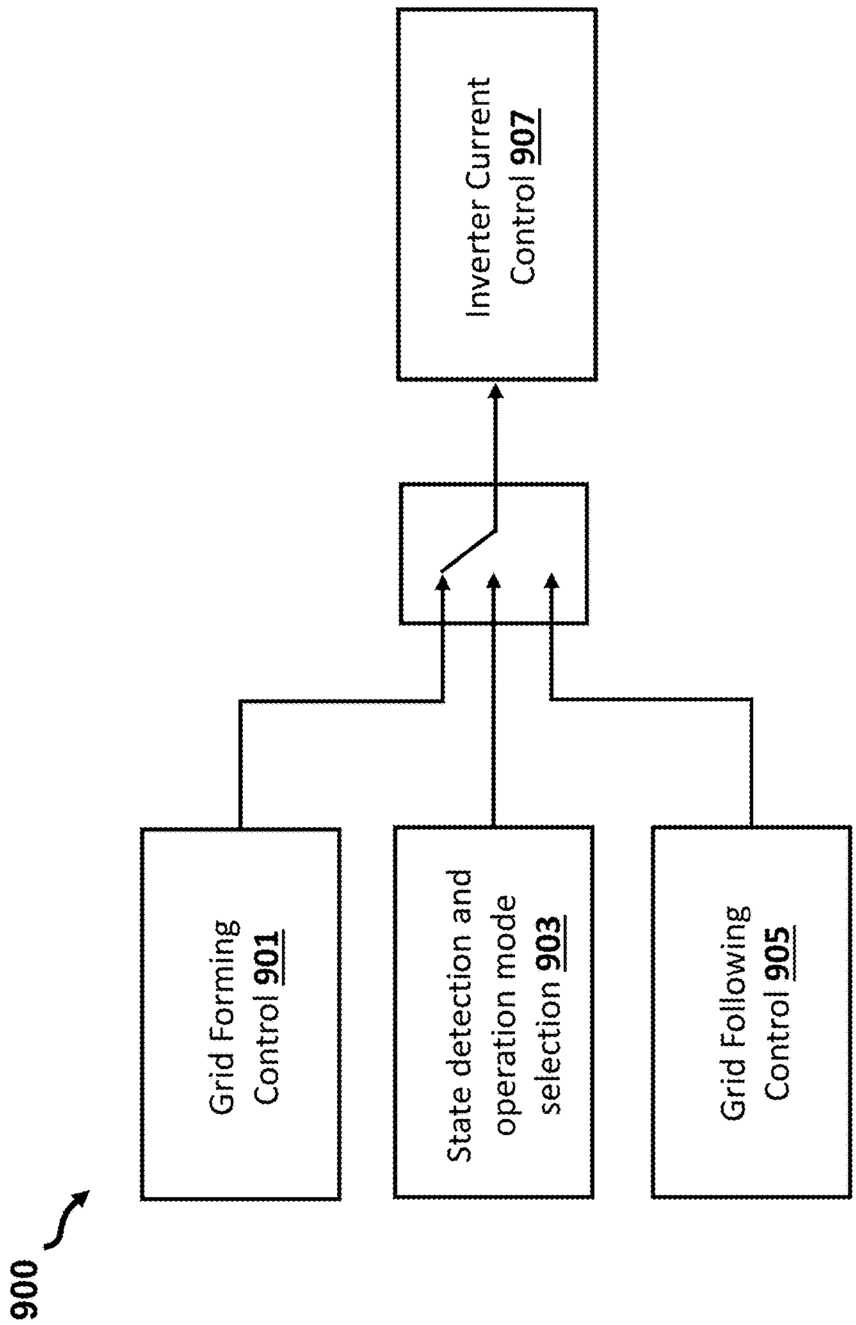
FIG. 9 shows a data flow for autonomous control modes of the multilevel converter, according to an embodiment.

FIG. 9 shows data flow amongst components of a system 900 for autonomous control modes of a multi-level converter (e.g., multi-level converter 440, 540) of a grid adapter for performing functions for inverter current control 907. The system 900 includes a multilevel converter, though embodiments may include any number of additional or alternative types of VSCs or other types of power processing units (e.g., DC/DC converters 445, 545; AC/DC converters 446, 546; Bidirectional DC/DC converters 444, 544). The multi-level converter includes a controller that implements certain control functions and algorithms, including functions for grid-forming control 901 and grid-following control 905, which include processor-executed control algorithms and functions 901, 905, 907 that perform control functionalities on inputted electrical signals. The functions of the multi-level converter may include an algorithm for state detection and operation mode selection 903. The state detection and operation mode selection 903 may detect and identify various conditions of an external grid or external storage system. The control algorithms and functions 901, 905, 907 of the controller of the multi-level converter may perform the control functions based upon the detected conditions produced by the state detection and operation mode selection 903.

Grid Adapter Enhances the Stability of Power System Operation

The grid adapter is also able to support the upstream distribution grid voltage and frequency using the droop control concept to provide the required amount of active and reactive power according to the deviation of the voltage and frequency from their nominal values. This would permit the grid to host more renewable power as DERs and EV charging stations even outside the grid adapter nano-grid without having to reinforce the grid to host these additional elements. This support is achievable for the active power due to the internal HESS included in the grid adapter.

Figure 10:
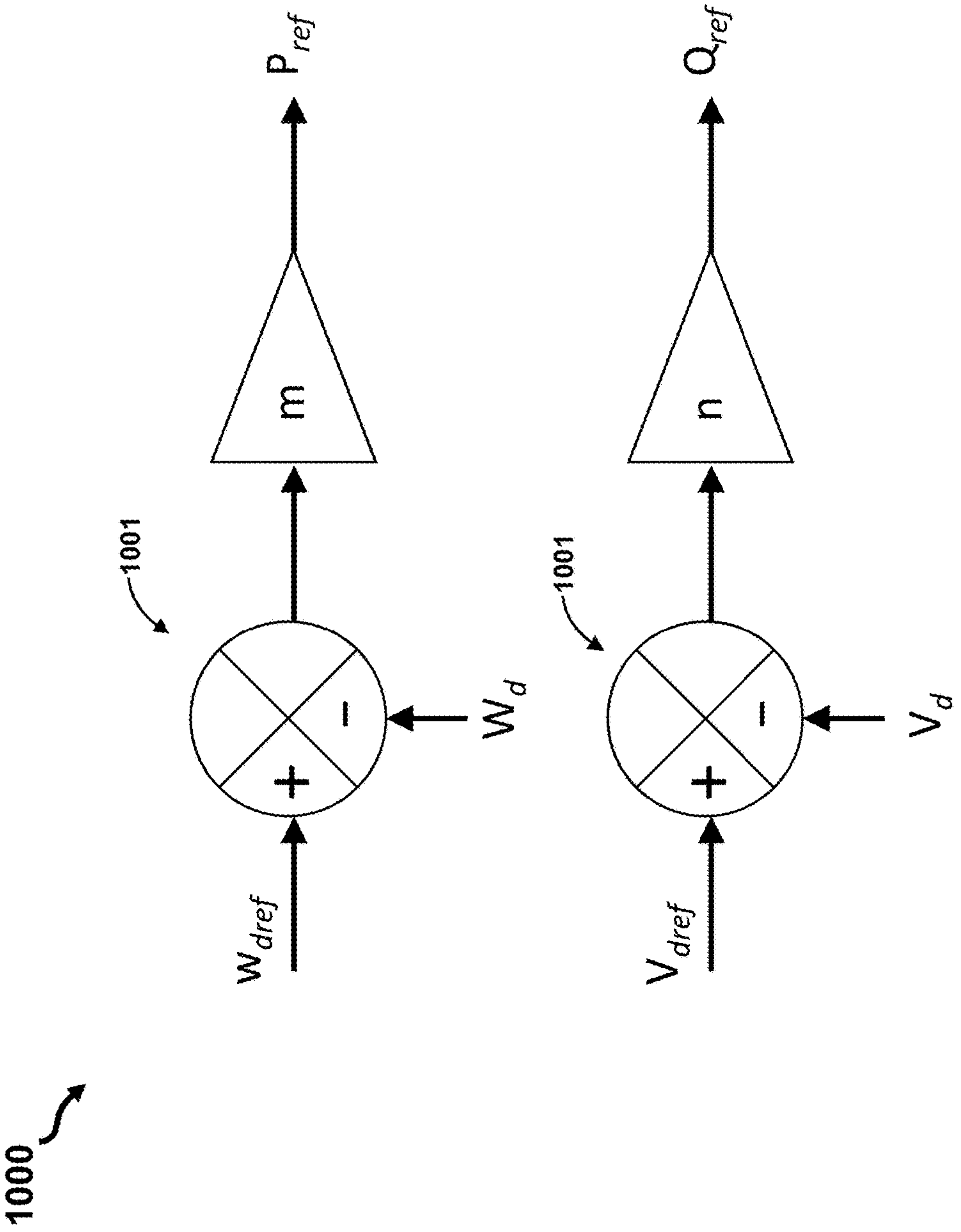
FIG. 10 includes a block diagram depicting data flow for a grid-support control system, according to an embodiment.

FIG. 10 includes a block diagram depicting data flow for a grid-support control system 1000. The control block diagrams depict the proportional control operations to implement the droop control 1001 to support the grid by active power proportionally to the deviation in the frequency and support the grid by reactive power proportionally to the deviation in the voltage. The droop control applies proportional control to support the grid according to active power (Pref) proportionally to the deviation in the frequency (Wdref, W), and support the grid according to reactive power (Qref) proportionally to the deviation in the voltage (Vdref, Vd).

Grid Adapter Serves as an Aggregator Node for DMS

The grid adapter has the central controller (EMS) which is capable of communicating using standard communication protocols and media to the distribution management system (DMS) which is the core of the smart grid concept of operation. This communication link would allow the transfer of the measurements and setpoints to improve the operation of the complete distribution system through the different functionalities of the DMS like volt/var control, optimal operation, state estimation and others. In case the distribution grid has number of these grid adapters they would act as control agents to the overall DMS and therefore act as data concentrators and augmenting agents within the smart grid environment.

Figure 11:
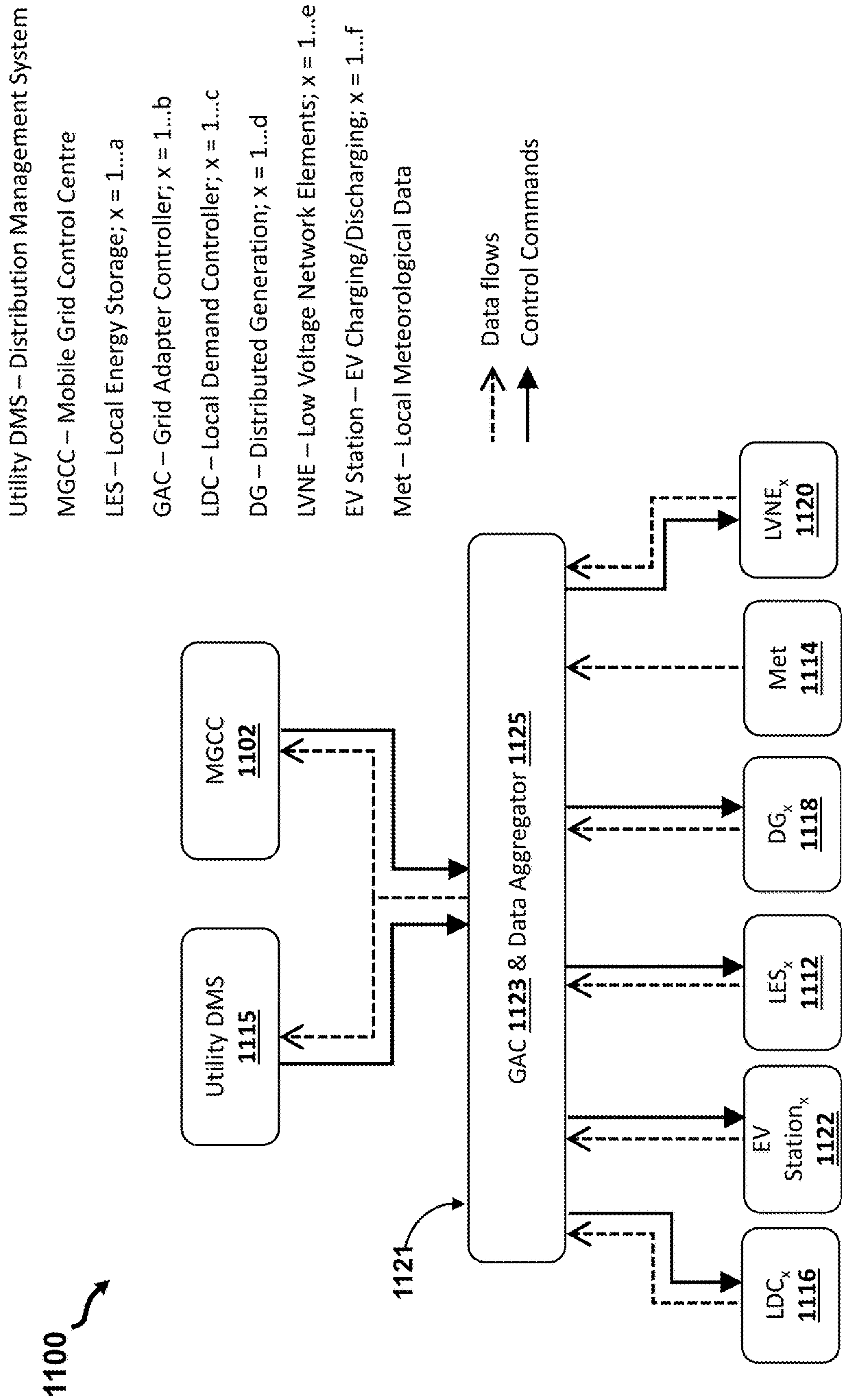
FIG. 11 shows data flow and control architecture with external components, according to an embodiment.

FIG. 11 shows data flow and control architecture amongst a MEG system 1100 with external components. The system 1100 includes a Utility Distribution Management System (DMS) 1115, MGCC 1102, LES 1112, grid adapter 1121 having a GAC 1123 and data aggregator 1125, LDC 1116, DG 1118, local meteorological data (Met 1114), and LVNE 1120. The MEG system 1100 includes various subsystems comprising servers that execute controller software for controlling operations of the particular subsystems, such as a MEG controller (of the MGCC 1102) or GAC 1123), among others. The MEG system 1100 comprises a control and communication network architecture hosting data communications between the various subsystems of the MEG system 1100. Various aspects of the system 1100, such as the LDC 1116, DG 1118, the Met 1114, utility DMS 1115, and the LVNE 1120, have been described in FIG. 2 and elsewhere, and certain details need not be repeated here.

The network architecture includes various hardware and software components of one or more public or private networks that interconnect the various subsystem components of the MEG system 1100. Non-limiting examples of such communications networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The control of the MEG system 1100 relies on a centralized concept to operate the MEG system 1100 in an efficient and secure manner, where the MEG system 1100 is operationally controlled by the one or more servers that execute the software controllers located at each subsystem. The controllers receive and evaluate information for governing the operations of the subsystems, such as operational data for generators, geographic information for the various subsystem locations, energy storage indicating inventory at given locations, amounts of energy in transit, historical and forecasted energy consumption, weather forecast (e.g., meteorological data 1114), and the like.

Servers (or other computing devices) at the MGCC 1102 may supervise some, most, or all operations of the MEG system 1100 to allow an optimal utilization of various available energy resources while maximizing a needed level of power quality to the consumers and prosumers. For instance, the server of the MGCC 1102 sends set-points to grid adapters 1121 and schedules or issues the commands to the SEVs or other components of the system 1100 to charge/discharge certain amounts of electricity, to achieve the various set goals of the MEG system 1100. In some implementations, the servers of the MGCC 1102 receive from the controllers of the system 1100, such as the GAC 1123 of the grid adapter 1121, the status and health conditions of downstream components. The server of the MGCC 1102 evaluates the status, health conditions, and operational details to ensure the reliable and safe operation of these subsystems.

The LES 1112 may communicate (e.g., wirelessly, wired) with the MGCC 1102 or other components of the system 1100 to dispatch and control operations of the LES stations 1112, while ensuring safe and reliable conditions. The LES stations 1112 communicate (e.g., wirelessly, wired) with the GAC 1121 to exchange set-points and monitoring information.

The grid adapter 1121 includes the GAC 1123 and the data aggregator 1125. The GAC 1123 includes software and hardware components for managing operations of the grid adapter, as discuss herein. The data aggregator 1125 may include a non-transitory machine-readable store for gathering and storing energy data and meteorological data 1114 from the various components of the system 1100 that produce energy data referenced by the GAC 1123.

Continuous Operation for Off-Grid or Islanded Systems Using Grid Adapters

As mentioned, the grid adapter enables continuous islanding of downstream micro-grids or nano-grids for varied durations of time, where the connectivity with a distribution network grid is non-existent or inconsistent. The grid adapter may also facilitate curtailment-free generation of power for downstream renewable energy generators (REGs). In some implementations, a grid adapter enables simultaneous charging and discharging of the external ESSs connected to the grid adapter system. This simultaneous charging and discharging are achieved through control of bidirectional DC/DC converters and isolation of internal DC links within the grid adapter. simultaneous charging and discharging, together with the delivery of energy via SEVs coordinated with the Mobile Grid Control System (MGCC), enables the grid adapter to achieve continuous islanding of downstream micro-grid or nano-grids, as well as curtailment free generation of REGs. In some cases, the bidirectional DC/DC converters of the grid adapter also enable ESS charging and discharging to be achieved by both electrical and non-electrical methods as described below.

Figure 12A:
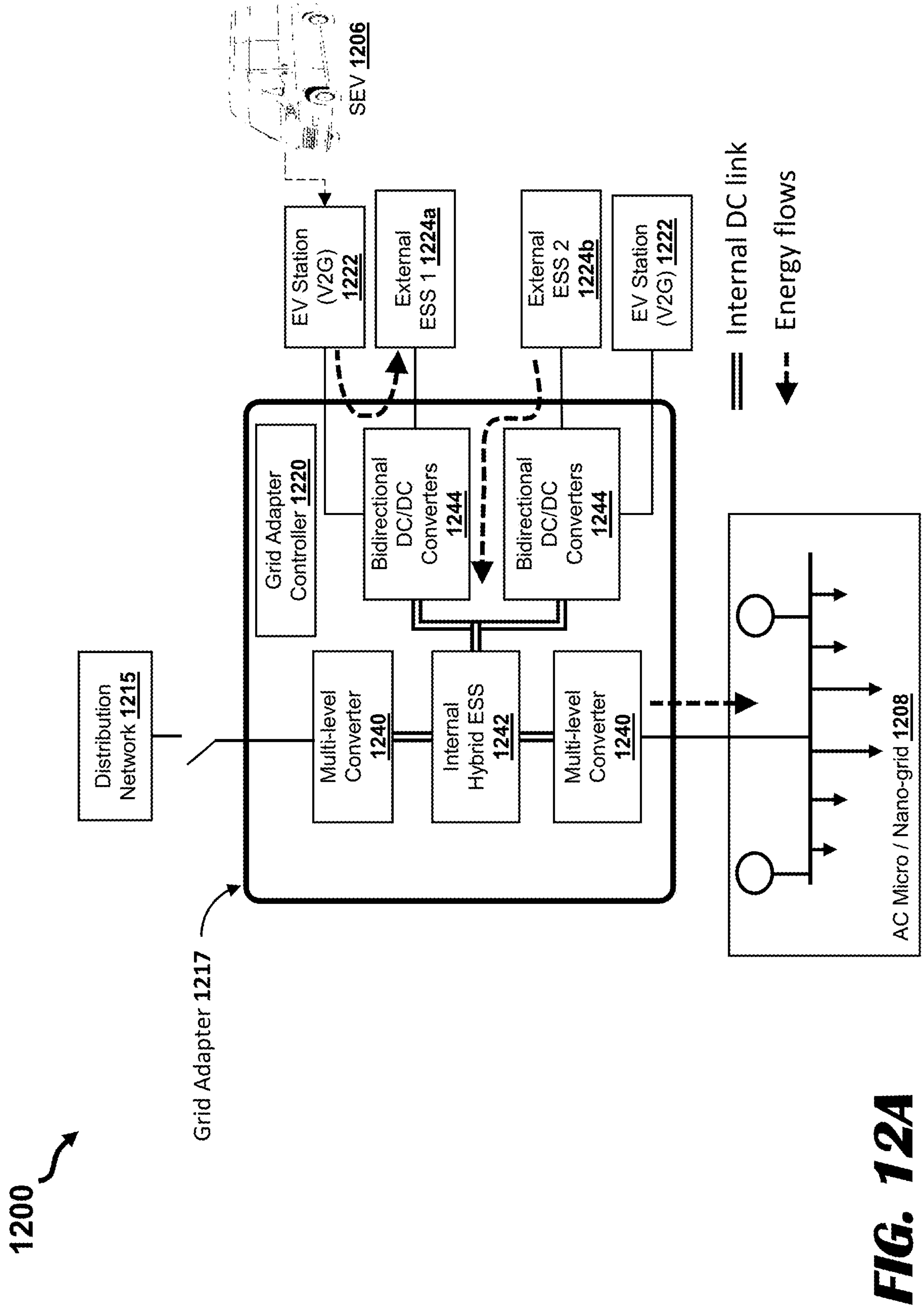
FIG. 12A shows a system implementing a grid adapter collocated or remotely situated and configured for a managed or controllable micro-grid or nano-grid for continuous islanding using electrical charging/discharging method, according to an embodiment.
Figure 12B:
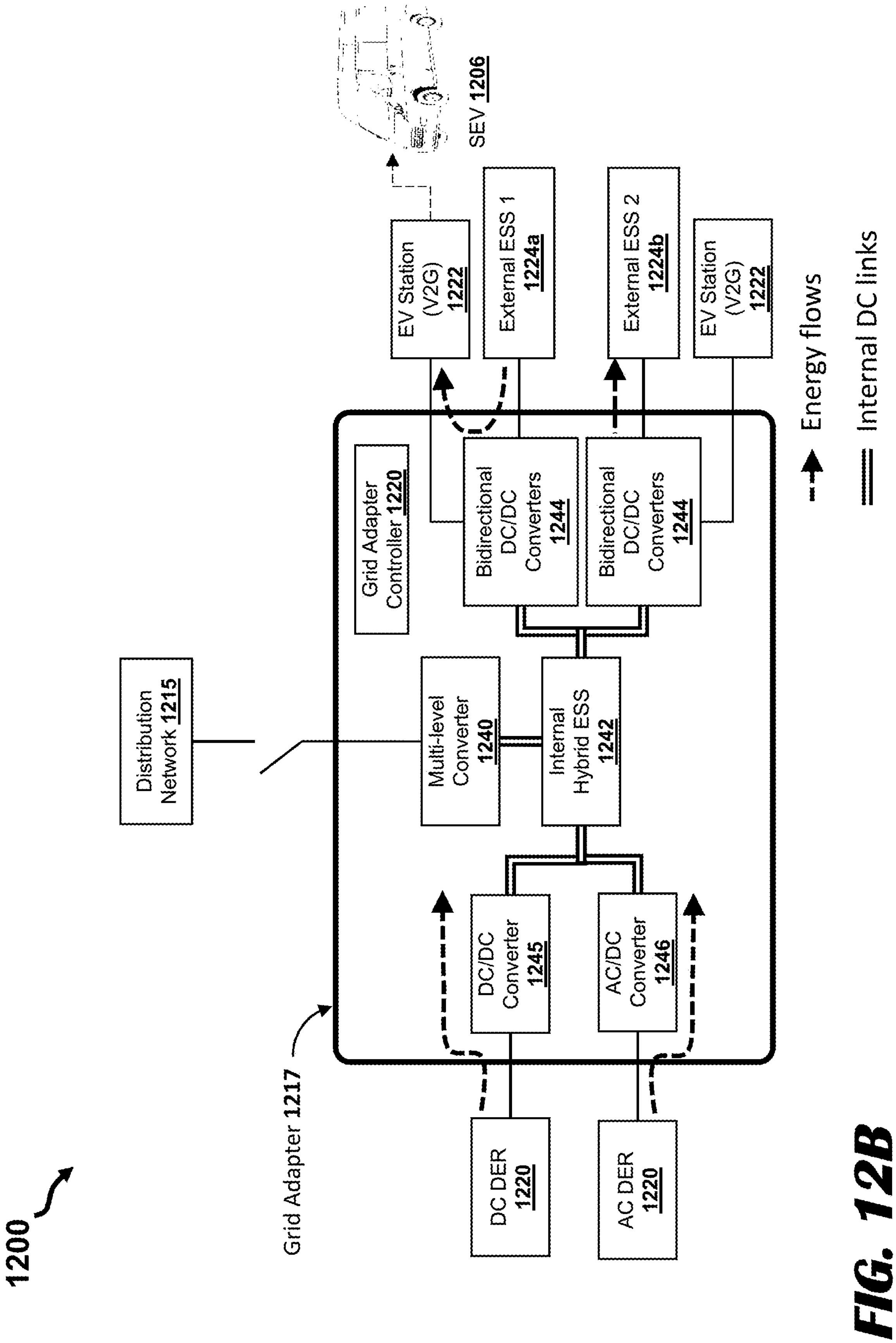
FIG. 12B shows a system implementing a grid adapter collocated or remotely situated and configured for curtailment free generation using electrical charging/discharging method, according to an embodiment.

FIGS. 12A-12B shows a system 1200 with various architectures of a grid adapter 1217 for various implementations for islanding for any duration time in which the grid adapter is disconnected from a distribution network 1215, according to example embodiments. The grid adapter 1217 shown in FIGS. 12A-12C includes power processing units for power electronic stages and an internal HESS 1242. Components of the system 1200 are similar to those features and functions described in FIG. 4 and FIGS. 5A-5C. As such, certain details need not be repeated in describing FIGS. 12A-5B.

FIG. 12A shows a grid adapter 1217 collocated or remotely situated and configured for a managed or controllable micro-grid or nano-grid 1208, where the grid adapter 1217 is not in wired connection with the distribution network 1215. The system 1200 includes a nano-grid 1208, EV stations 1222 that couple to SEVs 1206, and external ESSs 1224*a*-1224*b* (generally referred to as external ESSs or an external ESS 1224). The grid adapter further includes a grid adapter controller 1219. Where the grid adapter 1217 is collocated with the nano-grid 1208, the grid adapter controller 1219 may be the same or distinct device and software programming as a nano-grid controller (not shown) of the nano-grid 1208.

As depicted in FIG. 12A, the SEV 1206 may discharge power at the EV station 1222, which flows to a bidirectional converter 1244. The bidirectional converter 1244 is also coupled to a first external ESS 1224*a*. As the input energy from the SEV 1206 arrives at the EV station 1222, the grid adapter controller 1220 determines that the inputted power received from the SEV 1206 may be stored into the first external ESS 1224*a*. In some circumstances, the grid adapter controller 1217 determines that the power inputted to the grid adapter 1217 from an EV station 1222 or a second external ESS 1224*b* may be stored into an internal HESS 1242. When the input power arrives at the EV station 1222, and the grid adapter controller 1220 determines that the inputted power will be stored into the first external ESS 1224*a*, the bidirectional converter 1244 may apply various power conversion stages. The first external ESS 1224*a* may then be electrically charged by the input power from the SEV 1206, though the second ESS 1224*b* provides the necessary energy to maintain reliable power supply for the downstream micro-grid or nano-grid 1208 that is electrically disconnected from the distribution network 1215. As a result, a continuous islanding capability is achieved without the need for disconnecting, de-energizing, and re-energizing the downstream micro-grid or nano-grid 1208.

FIG. 12B shows a grid adapter 1217 collocated or remotely situated and configured for a managed or controllable micro-grid or nano-grid 1208, where the grid adapter 1217 is not in wired connection with the distribution network 1215 and facilitates curtailment-free power generation from DER 1220 equipment (e.g., DC DER, AC DER). The system 1200 includes the DERs 1220 (e.g., AC DER, DC DER), optional nano-grids (not shown), EV stations 1222 that couple to SEVs 1206, and external ESSs 1224 situated at, for example, end-consumer locations or remote storage locations. The DER 1220 may include subsystems comprising hardware and software components for supplementing distribution networks 1215 or enhancing power generation and distribution infrastructures (e.g., solar panels, wind turbines). For a DC-based DER 1220, the grid adapter 1217 includes a DC/DC converter 1245, having an external-facing DC interface and internal-facing DC interface, which converts or applies electronic stages to reduce harmonics or other noise on the electronic waveform of input electricity or output electricity. For an AC-based DER 1220, the grid adapter 1217 includes an AC/DC converter 1246, having an external-facing AC interface and internal-facing DC interface, which converts or applies electronic stages to reduce harmonics or other noise on the electronic waveform of input electricity or output electricity.

As the REGs of the DERs 1220 generate power, the DERs 1220 direct the generated power to the grid adapter 1217. The input power is received and converted by the DC/DC converter 1245 or the AC/DC converter 1256 of the grid adapter 1217, which applies the various power conversion and noise reduction operations on the input electrical signal of the input power. The grid adapter 1220 then instructs the internal HESS 1242 to store the inputted power, as generated by and received from the DERs 1220. To achieve curtailment-free power generation, the grid adapter controller 1220 may instruct a fully charged first external ESS 1224*a* to electrically discharge the stored power (or overflow power) to the SEV 1206, via a bidirectional converter 1244, from the internal HESS 1242. The second external ESS 1224*b* may continue to charge from the REGs of the one or more DERs 1220.

Figure 13:
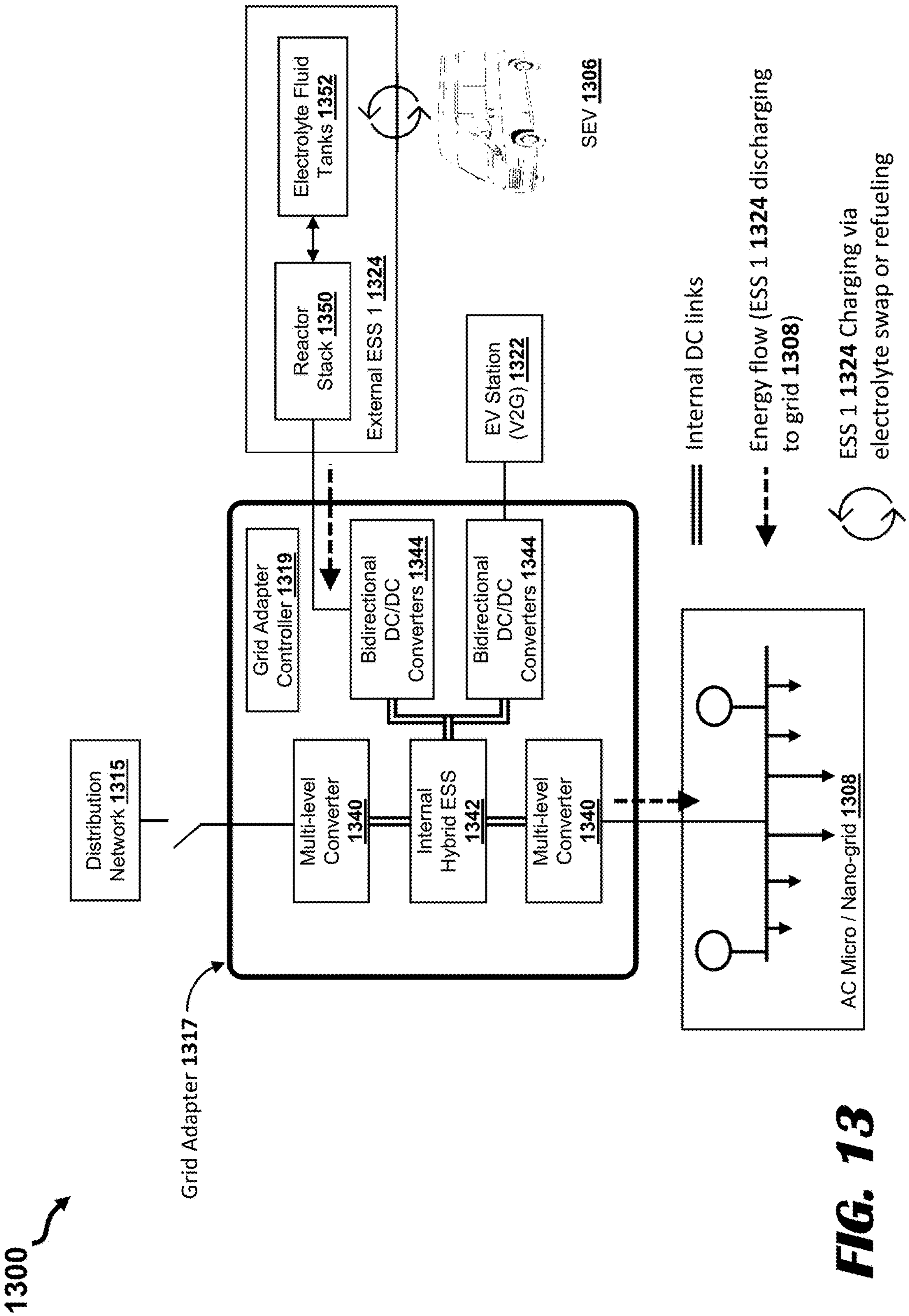
FIG. 13 shows a grid adapter collocated or remotely situated and configured for a managed or controllable micro-grid or nano-grid for continuous islanding using a non-electrical charging/discharging method, according to an embodiment.

FIG. 13 shows a system 1300 with an example architecture of a grid adapter 1317 for islanding using a non-electrical charging technique where the grid adapter 1317 is disconnected from a distribution network 1315, according to an example embodiment. Components of the system 1200 are similar to those features and functions described in FIG. 4, FIGS. 5A-5C, and FIGS. 12A-12B. As such, certain details need not be repeated in describing FIG. 13.

The system 1300 includes a nano-grid 1308 and EV stations 1322 that couple to SEVs 1206, and external ESSs 1324 for exchanging power with the SEVs 1306. The grid adapter 1317 further includes a grid adapter controller 1319. Where the grid adapter 1317 is collocated with the nano-grid 1308, the grid adapter controller 1319 may be the same or distinct device and software programming as a nano-grid controller (not shown) of the nano-grid 1308.

The external ESS 1324 comprises a reactor stack 1350 and electrolyte fluid tanks 1352. As shown in FIG. 13, a flow-based or hydrogen-based ESS 1324 is non-electrically charged through an electrolyte swap process or refueling from a tanker-based SEV 1306 carrying charged electrolyte or hydrogen fuel. The electrolyte swap and/or refuel approach allows charging of the ESS tanks 1352 without interrupting the discharging of the energy via the same reactor stack 1350 of the flow or fuel cell ESS 1324. In some embodiments, the simultaneous charging and discharging can also be achieved with two or more flow-based ESSs 1324 or hydrogen-based ESSs 1324, having a reactor stack 1350 for the ESS configuration shown in FIGS. 12A-12B, where one ESS 1324 is undergoing non-electrical charging or discharging, and the other ESS(s) 1324 are undergoing electrical discharging or charging in order to achieve continuous islanding or curtailment free generation functions.

Example Embodiments or Use Cases

The functional capabilities of the grid adapter lend to a number of use cases and applications. The different categories of applications are listed below (as shown in FIGS. 5A-5C):

- Equipment Level: the power level here would be according to the equipment itself and therefore can range from kWs to MWs. As such the grid adapter can act as the interface between the distribution grid and any form of renewable energy source, energy storage system, EV charging station, DC loads or others. All these equipment require certain control to allow their integration into the grid while satisfying the integration requirements according to the applicable grid codes.
- Micro-Grid Level: this would be for systems in the range of MWs interfacing the feeder to a certain micro-grid in the distribution system or an industrial facility with needed interfaces to the different elements like DC load, AC load, renewable generation, EV charging station, or others.
- Nano-Grid Level: this would be for systems in the range of kWs, like homes or small commercial facilities.

Non-limiting examples of benefits of the grid adapter include:

- Simplifying the distribution system upgrade planning and operation;
- Improving reliability against cascading power outages through islanding;
- Enabling scalable size and ratings allow multiple application areas, while ensuring the same behavior and performance (hence operational confidence) of the hardware and software;
- Enabling faster grid transition to meet net-zero targets;
- Future-proofing a distribution grid's ability to facilitate and interconnect various energy storage devices and vehicle-to-grid (V2G) solutions;
- Enabling communities in weak grids to adopt EVs and DER solutions without being subject to expensive grids upgrade costs; and
- Enabling generation capacity upgrades of existing wind power projects that are capacity delimited due to feeder line limitations.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:

a grid adapter between and connected to a source grid and a nano-grid for decoupling the source grid and the nano-grid, wherein the nano-grid is an alternating current (AC) nano-grid, the grid adapter comprising:

an internal storage system configured for storing an amount of internal-stored energy;

a plurality of power processing units comprising a plurality of power converters arranged in a series of power conversion stages, each power processing unit configured for converting an amount of power associated with the nano-grid, the plurality of power processing units comprising a first power processing unit including a bidirectional converter connected between the internal storage system and the nano-grid for converting input electricity to the nano-grid from the source grid and output electricity from the nano-grid to the source grid according to an operational instruction indicating a power flow direction, wherein the bidirectional converter is controlled to condition a first electricity waveform of power from the nano-grid according to one or more control algorithms and a required power quality level associated with the nano-grid; and a second power processing unit including a bidirectional converter connected between the source grid and the internal storage system and configured to condition a second electrical waveform of power from the source grid according to the one or more control algorithms and a required power quality level associated with the source grid; and a grid adapter controller configured for executing software programming, configured to:

receive, from one or more data sources, power data indicating a power requirement for the nano-grid or for the source grid;

determine the required power quality levels respectively associated with the nano-grid and the source grid; and transmit an instruction to the internal storage system to exchange the amount of power with the nano-grid or the source grid, via the plurality of power converters arranged in the series of power conversion stages of the plurality of power processing units including the first power processing unit, according to the power requirement.

2. The system according to claim 1, further comprising an external storage system for storing energy according to the grid adapter controller, including the amount of power indicated by the power requirement for the nano-grid.

3. The system according to claim 2, wherein the external storage system includes a first flow battery for exchanging the amount of power via an electrolyte swap with at least one of a second flow battery of a storage vehicle or a vehicle electrolyte tank of the storage vehicle configured to contain an electrolyte fluid.

4. The system according to claim 3, wherein the external storage system includes a reactor stack of the first flow battery and a storage system electrolyte tank configured to contain the electrolyte fluid.

5. The system according to claim 1, wherein each power processing unit of the plurality of power processing units includes one or more power conversion stages configured to condition a respective electricity waveform by reducing an amount of noise or harmonics on the respective electricity waveform.

6. The system according to claim 1, further comprising a third power processing unit configured to convert a second amount of power associated with a distributed energy resource, the third power processing unit includes a direct current-to-direct current converter for converting input electricity or output electricity according to the second amount of power.

7. The system according to claim 1, further comprising a third power processing unit configured to convert a second amount of power associated with a distributed energy resource, the third power processing unit includes an alternating current-to-direct current converter for converting input electricity or output electricity according to the second amount of power.

8. The system according to claim 1, wherein the second power processing unit including a multi-level converter configured to convert input electricity received from the source grid coupled to the grid adapter.

9. The system according to claim 1, wherein the grid adapter is operable to be disconnected from the source grid.

10. A system comprising:

a grid adapter between and connected to a distribution network grid and a nano-grid for decoupling the distribution network grid and the nano-grid, wherein the nano-grid is an alternating current (AC) nano-grid, the grid adapter comprising:

an internal storage system configured to store internal-stored energy;

a plurality of power processing units comprising a plurality of power converters arranged in a series of power conversion stages, each power processing unit configured for converting an amount of power for exchange with the nano-grid and the distribution network grid, the plurality of power processing units comprising a first power processing unit including a bidirectional converter connected between the internal storage system and the nano-grid and configured to convert the amount of power for exchange between the internal storage system and the nano-grid and the distribution network grid according to an operational instruction indicating a power flow direction, and wherein the bidirectional converter is controlled to condition a first electricity waveform of power from the nano-grid according to one or more control algorithms and a required power quality level associated with the nano-grid determined at a grid adapter controller; and a second power processing unit including a bidirectional converter connected between the distribution network grid and the internal storage system and configured to condition a second electrical waveform of power from the distribution network grid according to the one or more control algorithms and a required power quality level associated with the distribution network grid; and an external storage system comprising a first flow battery configured to exchange the amount of power using the plurality of power converters arranged in the series power conversion stages of the one or more power processing units including the first processing unit according to the operational instruction via an electrolyte swap with at least one of a second flow battery of a storage vehicle or an electrolyte tank of the storage vehicle.

11. The system according to claim 10, further comprising:

the grid adapter controller for executing software programming, configured to:

receive, from one or more data sources, power data indicating a power requirement for the nano-grid; and transmit an instruction to the internal storage system to exchange the amount of power with the nano-grid, via the first power processing unit, according to the power requirement.

12. The system according to claim 11, wherein the external storage system includes a reactor stack of the first flow battery and a storage system electrolyte tank configured to contain an electrolyte fluid.

13. The system according to claim 10, wherein each power processing unit of the plurality of power processing units includes one or more power conversion stages configured to condition a respective electricity waveform by reducing an amount of noise on the respective electricity waveform.

14. The system according to claim 10, further comprising a third power processing unit configured to convert a second amount of power associated with a distributed energy resource, the third power processing unit includes a direct current-to-direct current converter for converting input electricity or output electricity according to the second amount of power.

15. The system according to claim 10, wherein the second power processing unit includes a multi-level converter configured to convert input electricity received from the distribution network grid coupled to the grid adapter.

16. The system according to claim 10, wherein the grid adapter is operable to be disconnected from the distribution network grid.

17. A system comprising:

a grid adapter between and connected to a distributed network grid and a nano-grid for decoupling the distributed network grid and the nano-grid, wherein the nano-grid is an alternating current (AC) nano-grid, the grid adapter comprising:

an internal storage system configured for storing an amount of internal-stored energy;

a plurality of power processing units comprising a plurality of power converters arranged in a series of power conversion stages, each power processing unit configured for converting an amount of power associated with the nano-grid, the plurality of processing units comprising a first power processing unit including a bidirectional converter connected between the internal storage system and the nano-grid and configured to convert the amount of power for exchange between the nano-grid and the distributed network grid according to an operational instruction indicating a power flow direction, and condition a first electrical waveform of power from the nano-grid and an external storage system according to one or more control algorithms and a required power quality level associated with the nano-grid determined at a grid adapter controller; and a second power processing unit configured for converting distributed energy from the distributed network grid, the second processing unit includes a multi-level bidirectional converter connected between the distributed network grid and the internal storage system and configured to condition a second electrical waveform of the distributed energy from the distribution network grid coupled to the grid adapter according to the one or more control algorithms and a required power quality level associated with the distributed network grid determined at the grid adapter controller.

18. The system according to claim 17, wherein the external storage system comprises a first flow battery configured to exchange the amount of power via an electrolyte swap with at least one of a second flow battery of a storage vehicle or an electrolyte tank of the storage vehicle.

19. The system according to claim 17, further comprising:

the grid adapter controller for executing software programming, configured to:

receive, from one or more data sources, power data indicating a power requirement for the nano-grid; and transmit an operational instruction to the internal storage system to exchange the amount of power with the nano-grid, via the first power processing unit, according to the power requirement.

20. The system according to claim 17, further comprising a third processing unit for converting a second amount of power associated with a distributed energy resource, the third processing unit includes at least one of a direct current-to-direct current converter or alternating current-to-direct current converter configured to reduce noise on a third electrical waveform of the second amount of power from the distributed energy resource.

* * * * *